(12) United States Patent
Wu et al.

(10) Patent No.: US 12,065,829 B2
(45) Date of Patent: Aug. 20, 2024

(54) CELLULOSE-BASED STRUCTURAL FLOORING PANEL ASSEMBLY

(71) Applicant: DIALOG IP CORP., Toronto (CA)

(72) Inventors: Thomas Wu, Vancouver (CA); Daria Khachi, Toronto (CA); Craig Applegath, Toronto (CA)

(73) Assignee: DIALOG IP CORP., Toronto (CA)

( * ) Notice: Subject to any disclaimer, the term of this patent is extended or adjusted under 35 U.S.C. 154(b) by 301 days.

(21) Appl. No.: 17/614,363

(22) PCT Filed: May 22, 2020

(86) PCT No.: PCT/CA2020/000063
§ 371 (c)(1),
(2) Date: Nov. 25, 2021

(87) PCT Pub. No.: WO2020/243809
PCT Pub. Date: Dec. 10, 2020

(65) Prior Publication Data
US 2022/0243470 A1 Aug. 4, 2022

Related U.S. Application Data

(60) Provisional application No. 62/856,956, filed on Jun. 4, 2019.

(51) Int. Cl.
*E04C 2/00* (2006.01)
*B32B 7/03* (2019.01)
(Continued)

(52) U.S. Cl.
CPC ............... *E04C 2/14* (2013.01); *B32B 7/03* (2019.01); *B32B 7/08* (2013.01); *B32B 21/13* (2013.01);
(Continued)

(58) Field of Classification Search
CPC ..... E04C 2/14; E04C 2/40; E04C 2/50; E04C 3/122; E04C 5/0622; E04C 5/10; E04C 2002/001; E04C 3/26; E04C 3/292; E04C 3/12; E04C 3/18; E04C 5/08; E04C 1/40; E04C 3/29; E04C 2/26; E04C 3/293;
(Continued)

(56) References Cited

U.S. PATENT DOCUMENTS 4,442,119 A * 4/1984 Magarian ................ C07C 23/18
514/843
5,809,713 A * 9/1998 Ray ........................ E04H 12/04
52/223.7
(Continued)

FOREIGN PATENT DOCUMENTS

CN          108867962         11/2018

*Primary Examiner* — Chi Q Nguyen
(74) *Attorney, Agent, or Firm* — Jenna L. Wilson; Wilson Lue LLP

(57) ABSTRACT

A cellulose-based structural building panel assembly includes a cross-laminated timber (CLT) core which is reinforced with one or more post-tensioned tendons stressed to a pre-selected tensioning force, following the placement as part of the panel assembly. The tendons are provided within a sleeve which is grouted with a channel formed in an underside of the core and which after post-tensioning of tendons is infilled with a binder securing the tendons in a fully bonded configuration.

21 Claims, 16 Drawing Sheets

(51) Int. Cl.
- *B32B 7/08* (2019.01)
- *B32B 21/13* (2006.01)
- *E04B 5/02* (2006.01)
- *E04B 5/26* (2006.01)
- *E04C 2/14* (2006.01)
- *E04C 2/40* (2006.01)
- *E04C 3/12* (2006.01)
- *E04C 3/18* (2006.01)
- *E04C 5/06* (2006.01)
- *E04C 5/10* (2006.01)

(52) U.S. Cl.
CPC ............. *E04B 5/02* (2013.01); *E04B 5/26* (2013.01); *E04C 2/40* (2013.01); *E04C 2/50* (2013.01); *E04C 3/122* (2013.01); *E04C 3/18* (2013.01); *E04C 5/0622* (2013.01); *E04C 5/10* (2013.01); *B32B 2471/00* (2013.01); *E04C 2002/001* (2013.01)

(58) Field of Classification Search
CPC .. B32B 7/03; B32B 7/08; B32B 21/13; B32B 2471/00; E04H 12/04; E04E 5/12; E04B 5/23
See application file for complete search history.

(56) References Cited

U.S. PATENT DOCUMENTS

| | | | |
|---|---|---|---|
| 8,919,057 B1* | 12/2014 | Dupray | E04B 5/36 52/223.6 |
| 9,809,979 B2 | 11/2017 | Palermo et al. | |
| 2005/0188644 A1* | 9/2005 | Moure | E04C 2/40 52/582.1 |
| 2007/0175583 A1* | 8/2007 | Mosallam | B29C 70/088 428/411.1 |
| 2012/0124796 A1* | 5/2012 | Ibanez | E04C 3/07 29/33 K |
| 2012/0282025 A1* | 11/2012 | French | B28B 23/04 404/82 |
| 2012/0317905 A1* | 12/2012 | MacDuff | E04C 3/122 52/847 |
| 2013/0174503 A1* | 7/2013 | Olson | B28B 23/06 52/223.13 |
| 2013/0239512 A1* | 9/2013 | Yang | B32B 15/10 428/35.6 |
| 2014/0090317 A1* | 4/2014 | Nakashima | E04C 3/18 52/223.8 |
| 2016/0355994 A1* | 12/2016 | Penland, Jr. | B32B 3/266 |
| 2018/0305873 A1* | 10/2018 | Penland, Jr. | B32B 3/06 |

* cited by examiner

CELLULOSE-BASED STRUCTURAL FLOORING PANEL ASSEMBLY

RELATED APPLICATIONS

This application claims priority and the benefit of 35 USC § 119(e) to U.S. patent application No. 62/856,956, filed 4 Jun. 2019, the entirety of which is incorporated herein by reference.

SCOPE OF THE INVENTION

The present invention relates to a structural beam or building panel assembly. More preferably, the beam or building panel assembly is provided as a cellulose-based panel assembly which is adapted for at least partial pre-manufacture remotely, and then shipped to a selected installation site for use in commercial or high-rise building construction. In a most preferred construction, a building panel assembly is provided as a structural flooring panel assembly for use in high-rise construction, in substitution of conventional in situ formed reinforced concrete or structural steel suspended floors.

BACKGROUND OF THE INVENTION

In conventional high-rise Class A Office building construction, individual building floors are most frequently erected by the successive in situ casting of reinforced concrete floor slabs and beams, or by means of structural steel framing supporting a steel deck with concrete topping. The floor framing are supported by the building internal concrete core and typically span 12 to 14 metres to the exterior beams and columns. Typically, individual slabs and beams are cast by pouring concrete over a suitable removable wooden form on which a steel reinforcing mesh and/or open rebar frame has been positioned. Typically, an 8" to 12" thick layer of concrete is poured over the reinforcing mesh and frame, and then levelled to provide the desired slab integrity.

The environmental impact of using high volumes of concrete and steel in construction has recently received increased scrutiny. In particular, the manufacture of cement is known to be highly energy intensive, resulting in the emission of large volumes of $CO_2$. As a result, architects and builders have recently sought to adopt less carbon intensive materials and construction techniques in building design and constructions.

China Patent Application Serial No. CN108867962A, assigned to University Nanjing Forestry, published 23 Nov. 2018, describes a method of manufacturing a pre-stressed prefabricated cross-laminated timber (CLT) panel construction for use in small and medium bridge and building constructions. In the pre-tensioned panel construction, tendons are placed within grooves formed on one side of a cross-laminated timber panel. Jacks secured to each end of the tendons are then used to effect tendon pre-stressing. While the tendons are held under tension, end molds are positioned over the ends of the panel, and concrete is poured into the mold spaces and cured, fixing the tendons in place. The applicant has appreciated that the manufacture of such pre-stressed tendon reinforced CLT panels presents various design limitations that may factor in their receiving widespread acceptance in the construction industry. While the use of such panels for smaller and medium building applications has been proposed, such panels may possess structural limitations for larger building applications, where longer unsupported longitudinal panel spans of more than 5 metres, and typically more than 10 metres, may be required, such as in high-rise and commercial construction. In addition, the requirement of both pre-tensioning of the tendons, followed by the placement and full curing anchoring cement in specialized end molds, hinders rapid panel manufacture, particularly where panels of customized widths and/or lengths may be desired.

SUMMARY OF THE INVENTION

In a non-limiting construction, the present invention provides a cellulose-based structural beam, roof, wall and/or flooring panel assembly which may be used in a variety of construction applications. The panel assembly is provided with a core formed from laminating two or more layers of cellulose-based members, which are oriented in an obliquely and/or orthogonally alternating arrangement. The core is reinforced with one or more cables, rods, wires, beams embodiments, ropes and/or other elongated tendon structures (hereinafter collectively referred to as tendons) which are secured under tension for added panel strength. Most preferably, the core is a cellulose-based, cross-laminated timber (CLT) core which is reinforced with one or more post-tensioned tendons which have been stressed to a preselected tensioning force, following their placement and/or positioning as part of the beam or panel assembly.

In one possible non-limiting embodiment, the invention provides for a structurally reinforced cellulose-based support beam assembly. The support beam assembly incorporates a cellulose-based core formed from laminating two or more obliquely or orthogonally oriented layers of cellulose members or timbers. The cellulose core is reinforced with one or more tensioned tendons, and preferably one or more tendons which are grouted or otherwise mechanically coupled to the core, and which are post-tensioned following placement and/or positioning as part of the support beam assembly. The applicant has appreciated that the beam assemblies of the present invention may be used in building construction in place of conventional steel I-beams and/or conventional glue laminated timber beams.

In one possible use, the beam and/or panel assembly described herein may be provided as a pre-manufactured and/or modular beam or building panel assembly for use in the erection of high-rise buildings more than seven stories in height, and preferably Class A Office buildings over 20 stories in height. In one use, the panel assembly may be provided as a pre-manufactured and/or modular structural flooring panel assembly which may be used in place of conventional reinforced poured concrete slab and beam floors, or in place of erecting structural steel frames with a composite floor.

In another non-limiting embodiment, a longitudinally elongated structural support beam and/or building panel assembly is provided with a cross-laminated timber or cellulose (CLT) ply or core formed from at least two, preferably at least 3, and most preferably at least 5 layers of orthogonally oriented elongated timbers. Such timbers may include natural, jointed and/or micro-laminated natural or engineered timber beams. In another construction, the cellulose core of the panel assembly and/or support beam is formed from an odd number, and preferably at least five ply or layers of timbers formed from laminated veneer lumber (LVL), cross-laminated timber (CLT) layers, Mass Plywood Panels (MPP) or other similar engineered wood products, or combinations of LVL, CLT and/or such engineered wood products.

Where the support beam or building panel assembly is to be used in high-rise or commercial construction applications, the beam or panel assembly is preferably provided with a longitudinal length selected to span between the building core or elevator shaft and a building exterior or curtain wall. Such beams or panels may for example range in longitudinal length from at least 5 metres to about 20 metres, typically between about 10 and 15 metres, and preferably between 12 and 14 metres. Shorter or longer lengths may however be provided.

The longitudinal orientation of the timbers in the laminae of each of the individual layers of the core are preferably arranged in successively non-aligned or off-set orientations, and preferably are generally laminated in an arrangement perpendicular to that of each next adjacent layer.

The cellulose core is most preferably supported along its underside by tendons which are post-tensioned and provided as part of one or more associated reinforcing complex or assemblies positioned at least in part, within grooves or channels formed in the core. The reinforcing assemblies may be provided within a grouting or other suitable bonding material used to couple the tendons under tension to the core. Such bonding materials may include a reinforcing complex-encapsulating resin, grout, concrete or cement (hereinafter collectively grouting), which is inlayed at least partially into an associated groove or channel formed in the cellulose core.

The channels preferably extend longitudinally along the underside of the beam or panel assembly substantially the length of the core between each channel end, with the grouting inlaid therein extending as a longitudinally elongated cementaceous band. In non-limiting embodiments, all or part of the cementaceous bands may further project downwardly below the lower surface of core.

Preferably each reinforcing assembly includes one or more post-tensioned tendons which are provided within a tube, sleeve, or sheath and which are adapted for tensioning to a desired pre-selected tensioning force either at the time of initially manufacturing the beam or panel assembly, or following delivery and transport of the beam or panel assembly to a construction site and at the time of installation. The tendons preferably extend substantially the longitudinal length of the core. Most preferably, post-tensioned tendons are provided in the form of tensioned wires, rods or cable rope, which following the application of the desired tensile force thereto, are then maintained under tension by securing to one or both tendon ends, a suitable tendon end anchor or clamp.

In one possible non-limiting embodiment, the tendons may be provided within the metal or plastic jacket tube, sleeve or sheath (hereinafter collectively referred to as a sheath) selected to at least initially maintain isolation of the tendons from the grouting or bonding material.

In manufacture, and following setting of the grouting material, the tendons are preferably stressed by mechanically pulling one or both tendon ends, such as to stretch the tendon to a desired pre-selected tension. While the tendons are so stressed, they are locked into position, as for example, by the use of tendon anchor, anchor plates or other tendon or fastener. Although not essential, once the tendons are fixed under tension, the sheath may be in-filled with a suitable binder or bonding material, such as a bonding resin, cement, epoxy or grout, to assist in fixing the tendons in their tensioned state, and form a fully bonded system.

In another possible embodiment, combinations of both pre-tensioned and post-tensioned tendons may be provided in the reinforcement of the cellulose core.

In a further embodiment, a beam or building panel or reinforcing assembly is provided, in which tendons are partially or substantially disposed with a suitable sheath. The sheath may be formed from a variety of different materials, including metals, cellulose or plastics, and preferably is formed having a rigid or semi-rigid sidewall construction selected to resist compaction by any surrounding grouting. Most preferably, the sheath diameter is selected larger than the diameter of the tendon or grouping of tendons extending therein, by an amount selected to facilitate after post-tensioning of the tendons, the subsequent infilling of the sleeve interior by a suitable binder selected to fix the tendons in a fully bonded configuration. The binder may thus wholly encapsulate the tendons along their entire longitudinal length. The rigidity or semi-rigidity of the sleeve sidewall further advantageously resists sleeve collapse during its encapsulation in position within the channel or recess formed in the panel or beam. By maintaining its diameter, the sheath may further reduce mechanical interference during post-tensioning of the tendons, after the curing of the encapsulating grouting.

Metal or other suitable cross-tie reinforcements may optionally be provided to reinforce and/or confine the grouting or concrete bands laterally. Optionally one or more reinforcing anchor rods and/or bands or loops may be provided at longitudinally spaced locations along each channel to provide structural reinforcement to the grouting. The reinforcing bands may further be arranged or coupled relative to each other form a reinforcing cage about the tendons, to assist in both maintaining structural integrity of the encapsulating grouting and maintaining the positioning of the tendons relative to the core. Preferably, the grouted or concrete bands are also secured to the cellulose core by the use of mechanical connectors selected to provide a mechanical interlock between the grouting or concrete and a portion of the mechanical connectors, such as lag screws.

In a most preferred construction to be used in commercial or high-rise constructions, the panel or beam assembly is provided with an odd number and at least five, and preferably at least seven to nine stacked CLT layers of lumber or beams having an individual layer thickness selected at between about 4 and 20 cm, and preferably between about 5 and 15 cm. More or fewer stacked layers could, however, be provided depending on the specific layer thickness used, and span and load requirements.

In one possible construction, the channel or recess is formed longitudinally in the underside of the panel or beam, CLT core, extending inwardly upward within the core to an innermost end. Depending on the panel or beam span and the design loads, the channels and infilled reinforced grouting or concrete bands will typically have a lateral width the range of 10 cm to 60 cm wide, preferably 20 cm to 30 cm; and extend to a minimum depth of about 10 cm to 30 cm, and preferably about 14 cm to about 25 cm. The channel or recess may further be formed as a generally parallel-sided, rectangular-shaped groove formed in the underside of the CLT core, or alternatively may include downwardly inward tapering sidewall providing the channel with a dovetail cross-sectional profile. The innermost channel or recess end may extend parallel to the panel or beam top surface. More preferably, the innermost end of the channel is formed as a stepped or downwardly concave longitudinal curvature, such that the channel tapers or reduces downwardly in height from each channel end. The tendons, once secured within the channel are preferably provided in an orientation generally curving concavely downward from each tendon end. Optionally, where a beam cage is provided surrounding the tendons, the beam cage may optionally be as stepped or tapering downwardly in height from each longitudinal end of the CLT core.

Most preferably, the channels are formed to substantially provide cellulose core along its length with at least three and an odd number of ply or hardwood timber layers are laminated in an alternating orientation, and where the alternating orientation of the individual ply layers may advantageously facilitate burn-through resistance in the event of fire.

Accordingly, the present invention may reside in or include one or more of the following non-limiting aspects:

In one aspect, there is provided a structural building beam or flooring panel assembly having a longitudinal length and lateral width, the assembly comprising, a cross-laminated core having upper and lower surfaces and comprising at least five vertically stacked laminated beam layers, each said beam layer comprising a plurality of longitudinally elongated cellulose members arranged in a substantially parallel array, the longitudinal orientation of the cellulose members of the uppermost and lowermost beam layers being generally parallel, and wherein the array of cellulose members of each beam layer is arranged in a successively alternating normal orientation with the orientation of the array of cellulose members of the next adjacent beam layer, one or a plurality of longitudinally extending channels being formed in the lower surface, each channel extending vertically a minimum distance through at least one, and preferably at least two of said beam layers, a reinforcing assembly at least partially disposed in each said channel and comprising, a tensioning assembly comprising at least one elongated tendon extending longitudinally substantially the longitudinal length of the panel assembly, and grouting substantially encapsulating the tendon assembly and maintaining tendon assembly in position within said channel, and wherein the at least one elongated tendon comprises a post-tensioned tendon which has been subjected to a selected tensioning force and fixed in place under tension following settling of the grouting.

In another non-limiting aspect, there is provided a structural beam or building panel assembly, the assembly comprising, a cellulose-based cross-laminated timber (CLT) core, the core having generally planar upper and lower surfaces and comprising a plurality of laminated timber layers, each timber layer comprising a plurality of elongated timber members arranged in a substantially parallel array, the elongated orientation of the timber members of each array being oriented orthogonally relative to that of a next adjacent array, at lease one longitudinally extending channel extending inwardly into a top or bottom surface of said core, an associated reinforcing assembly at least partially disposed in each said channel, each reinforcing assembly including a tensioning assembly, grouting substantially encapsulating and securing said tensioning assembly positioned relative to said channel, and wherein each tensioning assembly includes, an elongated sheath, at least one tendon disposed within said sheath and extending longitudinally substantially the length of the channel, wherein the sheath being selected to sufficiently isolate the at least one tendon from said grouting to permit post-tensioning of the tendons following the setting of said grouting, and at least one tendon anchor selectively engageable with an end portion of at least one said tendon to maintain said at least one tendon under tension in a selected tensioned state relative to said core.

Additional further aspects of the invention may include, without restriction:

a-1) The assembly in accordance with any preceding or hereafter described aspects, wherein said tendons are selected from the group consisting of metal cable, a wire rope, a metal rod and a metal bar.

b-1) The assembly in accordance with any preceding or hereafter described aspects, further including a plurality of grouting anchors disposed in said channel, the grouting anchors being mechanically coupled to the core and configured for physical engagement with said grouting to assist in securing the reinforcing assembly in a position relative to said channel.

c-1) The assembly in accordance with any preceding or hereafter described aspects, wherein the grouting anchors comprises a plurality of threaded fasteners, the threaded fasteners being longitudinally spaced along the channel and having enlarged end portions adapted for encapsulation by said grouting.

d-1) The assembly in accordance with any preceding or hereafter described aspects, wherein the flooring panel assembly is provided as a structural flooring panel assembly for commercial or high-rise building construction and further comprises a cementaceous top coating overlying the upper surface.

e-1) The assembly in accordance with any preceding or hereafter described aspects, wherein the top coating has a vertical thickness selected at between about 1.5 and 6 inches, preferably about 2 and 4 inches.

f-1) The assembly in accordance with any preceding or hereafter described aspects, wherein further including a plurality of top anchors, the top anchors being coupled to the uppermost beam layer of said core and having upwardly projecting end portions selected for encapsulation by said top coating.

g-1) The assembly in accordance with any preceding or hereafter described aspects, wherein the top anchors comprise threaded fasteners having an enlarged uppermost end portion spaced a distance above the upper surface.

h-1) The assembly in accordance with any preceding or hereafter described aspects, wherein further including a reinforcing mesh, the assembly preferably being secured to an upwardly projecting end of the top anchors.

i-1) The assembly in accordance with any preceding or hereafter described aspects, wherein the reinforcing assembly includes a plurality of said post-tensioned tendons, and/or a plurality of band loops, to assist in maintaining the plurality of said tendons in a generally bundled configuration in said channel.

j-1) The assembly in accordance with any preceding or hereafter described aspects, wherein said tendons comprise twisted steel strand cables.

k-1) The assembly in accordance with any preceding or hereafter described aspects, wherein the tendons of each tensioning assembly are secured in said grouting in an arrangement curving concavely downwardly from each panel longitudinal end.

l-1) The assembly in accordance with any preceding or hereafter described aspects, wherein the tendons of each tensioning assembly are encased within a covering sleeve selected to physically isolate the tendons from the grouting.

m-1) The assembly in accordance with any preceding or hereafter described aspects, wherein the grouting comprises a concrete, the tendons being encapsulated in the concrete to a minimum depth of about 1 inch, preferably about 1.5 inches, and most preferably about 2.5 inches.

n-1) The assembly in accordance with any preceding or hereafter described aspects, wherein the reinforcing assembly comprises a hollow rebar, and/or metal rod or wire reinforcing beam cage, the tensioning assembly being disposed substantially within an interior of the beam cage.

o-1) The assembly in accordance with any preceding or hereafter described aspects, wherein each said channel has a dovetail cross sectioned profile.

p-1) The assembly in accordance with any preceding or hereafter described aspects, wherein the channels extend vertically upward into the lower surface through at least three said beam layers.

q-1) The assembly in accordance with any preceding or hereafter described aspects, wherein said flooring panel assembly has a lateral width selected at between about 2 and 12 metres, preferably between 2 and 4 metres; and/or a longitudinal length selected at between about 7 and 20 metres, preferably 10 to 15 metres, most preferably about 12 and 14 metres; and/or a thickness selected at between about 0.25 and 0.5 metres, preferably about 0.3 metres.

r-1) The assembly in accordance with any preceding or hereafter described aspects, wherein said cellulose members comprise integral or finger jointed 2" by 4" or 2" by 6" wooden boards or timbers.

s-1) The assembly in accordance with any preceding or hereafter described aspects, wherein said wooden boards comprise milled wood timbers of wood species selected from the group consisting of spruce, pine, maple, poplar, oak and fir.

t-1) The assembly in accordance with any preceding or hereafter described aspects, wherein the reinforcing assembly includes a longitudinally extending beam cage disposed about said at least one tendon, the beam cage tapering or stepped downwards in height from each panel end.

u-1) The assembly in accordance with any preceding or hereafter described aspects, wherein said at least one longitudinally extending channel has a cross sectional profile substantially corresponding to a cross sectional profile of one milled wood timber.

v-1) The assembly in accordance with any preceding or hereafter described aspects, wherein an innermost upper end of each said channel is formed having a stepped or downwardly concave profile.

w-1) The assembly in accordance with any preceding or hereafter described aspects, wherein said cellulose members comprise engineered wood boards.

x-1) The assembly in accordance with any preceding or hereafter described aspects, wherein each adjacent ones of said cellulose members or wood boards are glue laminated to each other substantially along juxtaposed surfaces.

y-1) The assembly in accordance with any preceding or hereafter described aspects, wherein the reinforcing assembly includes one or more pre-stressed tendons.

z-1) The assembly in accordance with any preceding or hereafter described aspects, wherein the assembly is a pre-manufactured flooring panel assembly for use in Class A high-rise building construction.

a-2) The assembly in accordance with any preceding or hereafter described aspects, for use as a structural floor panel in commercial, residential and/or high-rise construction.

b-2) The assembly in accordance with any preceding or hereafter described aspects, for use in high-rise construction of high-rise building of between 20 and 60 floors, and preferably between 30 and 60 floors.

c-2) A method of constructing a building floor using the flooring panel assembly in accordance with any preceding or hereafter described aspects, comprising forming in a concrete building core, a shelf or recess having a horizontal surface and dimensioned to receive a first longitudinal end portion of a panel assembly in a mounting position, mounting a steel or concrete peripheral support at a periphery of said building, the peripheral support being generally horizontal with said shelf or recess and positioned to supportingly engage the second other longitudinal end portion of the flooring panel in said mounting position, fixedly positioning the first end portion of the flooring panel assembly on said shelf or recess with the lower surface supported directly or indirectly thereby, and fixedly positioning the lower surface of the second end portion on the steel or concrete peripheral support.

d-2) A method of constructing the building floor using the panel assembly in accordance with any preceding or hereafter described aspects, comprising forming a shelf or recess, positioning a panel anchor in or on said shelf or said recess, said panel anchor being secured to said building core including a projecting portion adapted for direct or indirect mechanical coupling to a uppermost top layer, and, wherein following positioning of the first end portion, mechanically coupling the projecting portion to the upper concrete layer.

e-2) A method of constructing a building floor using the panel assembly in accordance with any preceding or hereafter described aspects, comprising a step of fixedly positioning the lower surface of the second end portion by mechanically fastening said second end portion to a steel support.

f-2) A method of constructing a building floor using the panel assembly in accordance with any preceding or hereafter described aspects, wherein prior to, concurrently with, or following the step of positioning the first end portion, grouting said first end portion within a shelf or recess.

g-2) A method of constructing a building floor using the panel assembly in accordance with any preceding or hereafter described aspects, wherein prior to, concurrently with, or following the step of positioning the second end portion, fire coating at least one of said steel support and/or said second end portion with a fire retardant coating.

h-2) A method of constructing a building floor using the panel assembly in accordance with any preceding or hereafter described aspects, wherein following the positioning of the first end portion and the second end portion, applying a top coating over the core.

i-2) A method of constructing a building floor using the panel assembly in accordance with any preceding or hereafter described aspects, wherein the top coating is applied over the core to a thickness selected to fully encapsulate the projecting portions of said panel top anchors.

j-2) A method of constructing a building floor using the panel assembly in accordance with any preceding or hereafter described aspects, comprising positioning against the flooring panel assembly in a side-by-side juxtaposed arrangement, a next flooring panel assembly, wherein the first end portion of the next flooring panel assembly being supported in or by the shelf or recess, and the second end portion of the next flooring panel assembly being supported by the peripheral support.

k-2) The assembly in accordance with any preceding or hereafter described aspects, wherein each tensioning assembly includes a plurality of said tendons.

l-2) The assembly in accordance with any preceding or hereafter described aspects, wherein the tensioning assembly includes a binder disposed in said sleeve or sheath and selected to fix the at least one tendon therein in a fully bonded configuration.

m-2) The assembly in accordance with any preceding or hereafter described aspects, wherein the binder is injectable and/or is selected from the group consisting of a cementaceous grout, an adhesive, an epoxy, cementaceous resin and a non-cementaceous resin.

n-2) The assembly in accordance with any preceding or hereafter described aspects, wherein the tensioning assembly further includes a longitudinally extending reinforcement cage substantially disposed in said channel, said reinforcement cage extending about a length of said at least one tendon.

o-2) The assembly in accordance with any preceding or hereafter described aspects, wherein the reinforcement cage is stepped or tapirs in height from each core end, and/or the at least one tendon extends longitudinally along an interior of the reinforcement cage and/or curves concavely downward from each tendon end.

p-2) The assembly in accordance with any preceding or hereafter described aspects, wherein the channel is selected from a parallel-sided U-shaped channel and a dove-tail formed channel.

q-2) The assembly in accordance with any preceding or hereafter described aspects, wherein the core comprises an odd number of said laminated timber layers.

r-2) The assembly in accordance with any preceding or hereafter described aspects, wherein the core comprises between 5 and 9 laminated timber layers.

s-2) The assembly in accordance with any preceding or hereafter described aspects, wherein said beam or building panel assembly comprises a structural floor panel assembly and/or having a longitudinal length selected at between about 5 and 20 metres, and preferably about 7.5 to about 15 metres.

t-2) The assembly in accordance with any preceding or hereafter described aspects, wherein the channel extends inwardly into the lower surface of the core to an innermost channel end, the innermost channel end extending steeped or concavely downward from each core end.

u-2) The assembly in accordance with any preceding or hereafter described aspects, wherein across a lateral cross-section of said channel, said core substantially has minimum thickness equal to at least a thickness of three said timber layers.

v-2) The assembly in accordance with any preceding or hereafter described aspects, wherein the timber members are selected from the group consisting of natural hardwood timbers, engineered wood timbers and micro-laminated timbers.

w-2) The assembly in accordance with any preceding or hereafter described aspects, wherein the timbers have a lateral width and height selected at between about 1 and 30 cm, preferably between about 2.5 and 15 cm, and most preferably between about 4 and 10 cm.

x-2) The assembly in accordance with any preceding or hereafter described aspects, further including a plurality of grouting anchors disposed at longitudinally spaced locations along said channel, said grouting anchors being selected from the group consisting of threaded mechanical fasteners, spikes and cleats.

y-2) The assembly in accordance with any preceding or hereafter described aspects, wherein said assembly comprises a structural floor panel assembly, the floor panel assembly further comprising a plurality of top anchors mechanically coupled to the upper surface of the core, the top anchors projecting upwardly from the top surface and including an upper end portion configured to achieve a physical interlock with a curable panel cover layer.

z-2) The assembly in accordance with any preceding or hereafter described aspects, wherein said top anchors comprise threaded bolts secured to said panel in an orientation non-orthogonally aligned relative to said upper surface.

a-3) The assembly in accordance with any preceding or hereafter described aspects, wherein said assembly is selected from one or more of the group consisting of a prefabricated building panel assembly and a modular building panel assembly.

b-3) A method of manufacturing the assembly in accordance with any preceding or hereafter described aspects, comprising
laminating said timber layers to form said core with a longitudinal length selected at between about 5 and 15 metres,
forming said at least one channel in said upper or lower surface, each said channel substantially extending longitudinally from a first end of said core to a second other opposite end of said core,
positioning the sheath and the at least one tendon of each tensioning assembly in the associated channel,
at least partially encapsulating said sheath in said associated channel with said grouting, and
following setting of said grouting, applying a selected tensioning force to said at least one tendon, and
while said at least one tendon under said selected tensioning force, securing the tendon ends to maintain the tendon in a tensioned state.

c-3) The method in accordance with any of the preceding or hereafter comprising, a step of securing the tendon end which includes coupling a tendon anchor to at least one said tendon end.

d-3) The method in accordance with any preceding or hereafter described aspects, wherein following the application of the selected tensioning force, injecting a binder into said sheath or sleeve to substantially fix each of the tendons therein.

e-3) The method in accordance with any preceding or hereafter described aspects, wherein prior to encapsulating said sheath with said grouting, securing a reinforcement cage to said core an orientation extending longitudinally along said channel, and wherein the step of encapsulating the sheath includes substantially encapsulating said reinforcement cage with said grouting.

f-3) The method in accordance with any preceding or hereafter described aspects, wherein said assembly comprises a structural panel assembly for use with a curable cover or top layer said method further comprising coupling a plurality of said top anchors the upper surface of the core, the top anchors being selected to provide a mechanical connection with said curable cover or top layer.

g-3) The method in accordance with any preceding or hereafter described aspects, further comprising covering said upper surface with a curable cover or top layer in a thickness selected to substantially cover said top anchors.

h-3) The method in accordance with any preceding or hereafter described aspects, wherein the curable cover or top layer comprises a concrete cover layer having a thickness selected at between about 1 cm and 20 cm, and preferably about 2.5 and 10 cm.

i-3) The method in accordance with any preceding or hereafter described aspects, comprising forming a plurality of said channels in or lower surface of the core, the channels being parallel and/or spaced laterally from each other by a distance selected at between about 30 cm and 200 cm, and preferably about 50 cm and 150 cm.

j-3) The method in accordance with any preceding or hereafter described aspects, wherein said assembly comprises a structural floor panel assembly, and/or said step of laminating said timber layers comprises forming said core with a lateral width selected at between about 2 and 10 metres, and preferably about 3 and 7.5 metres.

k-3) Use of assembly in accordance with any preceding or hereafter described aspects, in the construction of a floor of a high-rise building, the high-rise building including an inner building core and an outer wall support member spaced from said building core, the panel assembly most preferably comprising a structural flooring panel assembly which extends longitudinally from a first end adjacent said building core to a second end adjacent said outer wall support.

l-3) The use in accordance with any preceding or hereafter described aspects, further wherein a covering cement layer is overlaid over an upper surface of said structural flooring panel assembly core, the covering cement layer being formed with a thickness selected at between about 3 and 20 cm, and preferably about 4 and 10 cm.

m-3) The use in accordance with any preceding or hereafter described aspects, wherein said covering cement layer is mechanically coupled to said structural flooring panel assembly by way of mechanical interlock with a plurality of top anchors mechanically coupled to and projecting above the upper surface of the core.

n-3) The use in accordance with any preceding or hereafter described aspects, wherein tendon anchors are disposed in an associated anchor recess or pocket formed in each of the first and second ends, each anchor recess or pocket being sized for juxtaposed placement against a supporting surface of a flange or surface of the respective building core or outer wall support used to respectively support the first and second panel ends.

o-3) The use in accordance with any preceding or hereafter described aspects, wherein said structural flooring panel comprises one of a plurality of structural flooring panels which are provided for mounting to said flange or surface of the respective building core or outer wall support as a substantially pre-manufactured unit.

p-3) The assembly in accordance with any preceding or hereafter described aspects, wherein the structural beam or building panel assembly having a longitudinal length and lateral width, and comprising a cross-laminated timber (CLT) core having upper and lower surfaces and comprising at least five vertically stacked laminated beam layers, each said beam layer comprising a plurality of longitudinally elongated natural wood timbers bonded in an edge-to-edge manner and arranged in a substantially parallel array, the longitudinal orientation of the cellulose members of the uppermost and lowermost beam layers being generally parallel to a longitudinal length of the panel or beam, and wherein the orientation timbers in each beam layer is arranged in a successively alternating normal orientation with respect to the orientation of the timbers of the next adjacent beam layer, one or a plurality of longitudinally extending channels being formed inward in the lower surface, each channel extending vertically with the beam or building panel assembly having a minimum lateral thickness of at least three of said beam layers substantially along its longitudinal length.

q-3) The assembly in accordance with any preceding aspects, wherein a reinforcing assembly is at least partially disposed in each said channel and comprises a tensioning assembly comprising at least one elongated sheath extending longitudinally substantially the longitudinal length of the panel assembly, a plurality of post-tensioned cables disposed in said sheath and grouting substantially encapsulating the tendon assembly and generally maintaining said tendons in position within said channel, and wherein the post-tensioned cables have been subjected to a selected tensioning force and fixed in place under tension following settling of the grouting.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
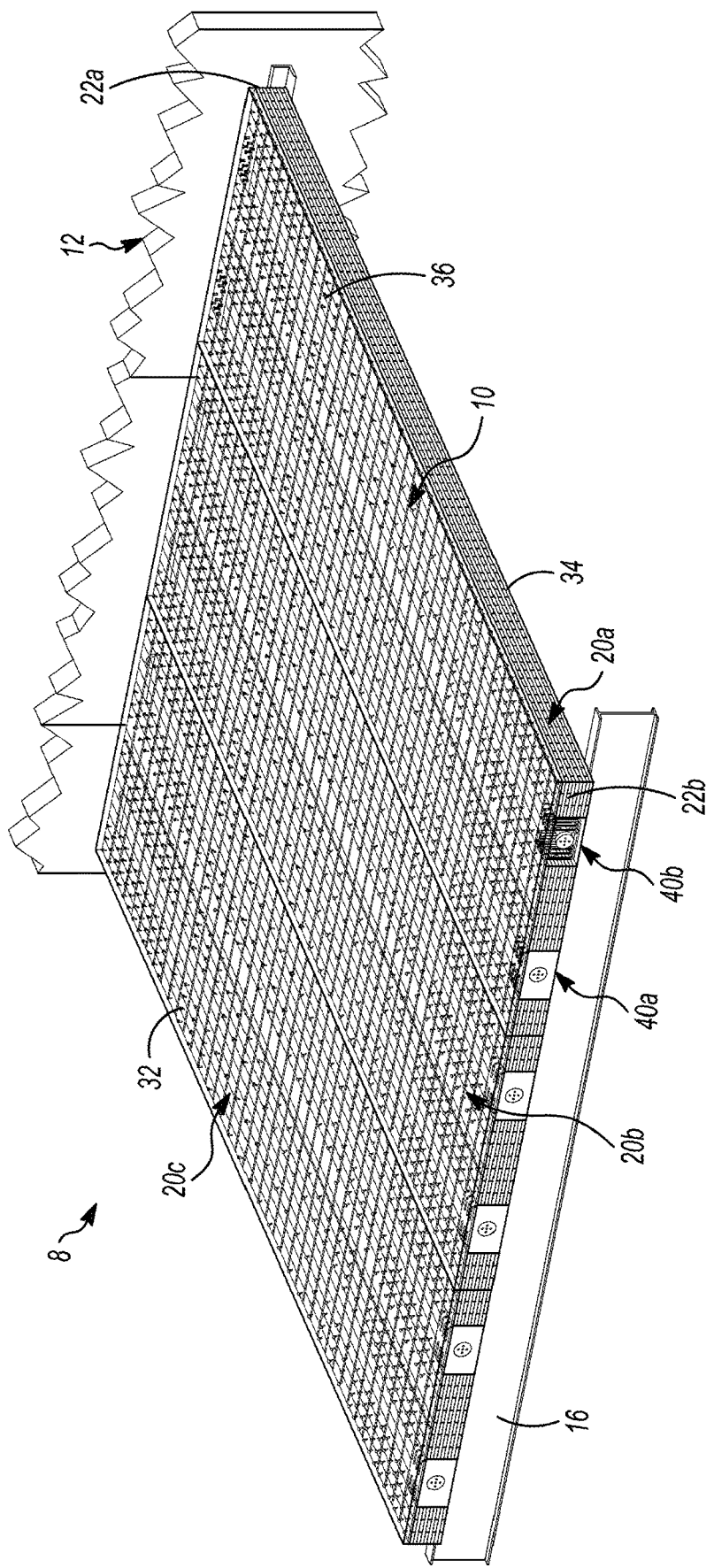
FIG. 1 illustrates a partial schematic view of a high-rise building floor formed using a number of pre-manufactured structural flooring panel assemblies in accordance with a preferred embodiment of the invention.

Reference is made to FIG. 1 which illustrates a partial cut-away view of a Class A high-rise building 8 which has a building floor 10 formed using a number of structural flooring panel assemblies 20a, 20b, 20c; and which are overlaid by a top concrete layer 36. As will be described, each of the flooring panel assemblies 20a, 20b and 20c is preferably pre-manufactured off-site as at least a partially pre-manufactured unit. The flooring panel assemblies 20 are delivered substantially ready for installation, in a substantially unsupported position spanning between the building elevator core 12 and the outermost building perimeter support wholly, such as a peripherally extending I-beam support 16, or other such steel or concrete structure.

FIG. 1 illustrates each flooring panel assembly 20a, 20b, 20c as each being generally rectangular, and extending longitudinally from respective innermost first end 22a which are fixedly coupled to the building core 12, to outermost second end 22b which is secured to the perimeter support beam 16. In the embodiment shown, each panel assembly 20a, 20b, 20c is provided with the identical size and shape to simplify design and installation. Different sizes of panels assemblies 20 could however, be used depending on the overall building architecture and floor 10 configuration.

Figure 2:
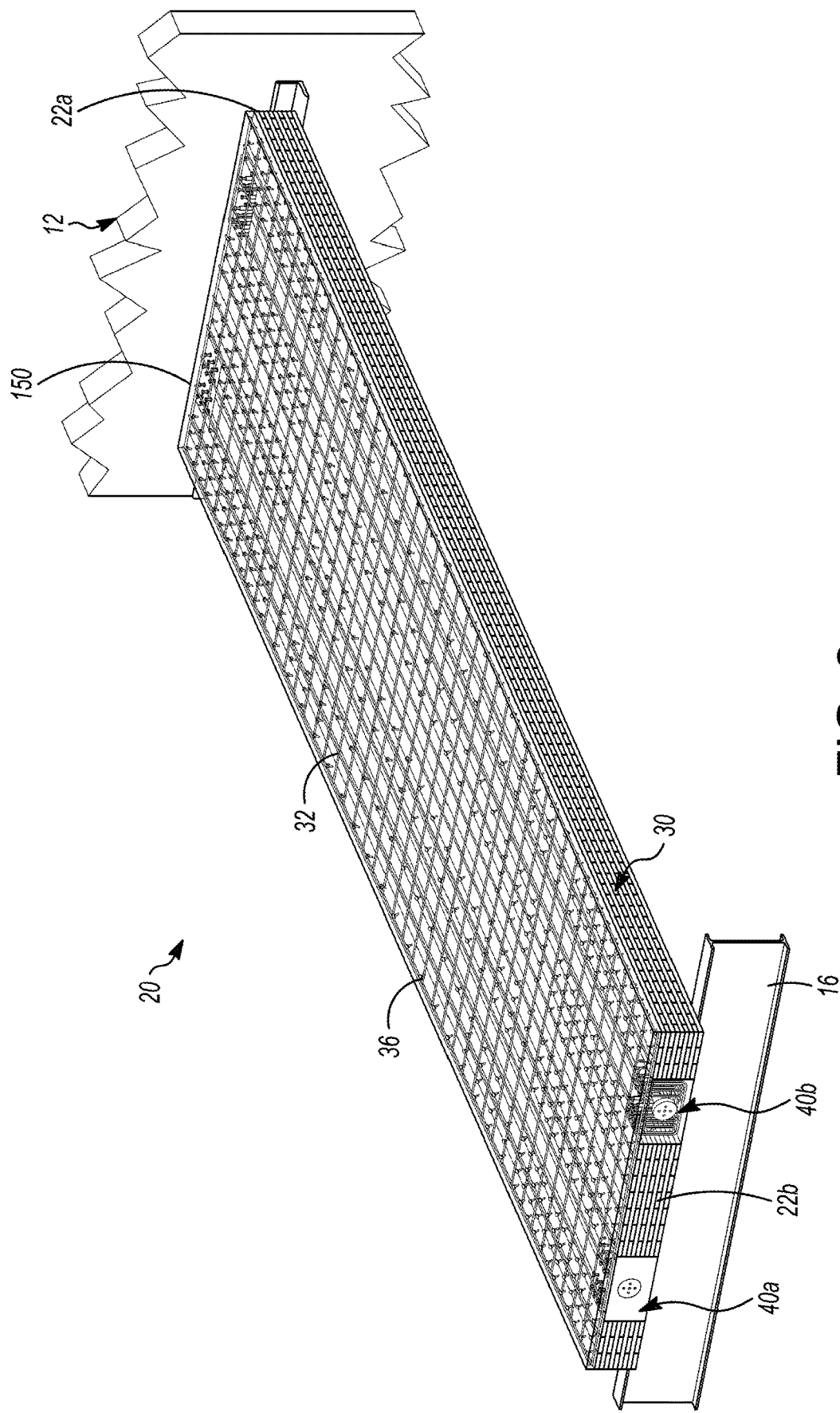
FIG. 2 shows schematically a top perspective view of a structural flooring panel assembly used in the construction of the building floor shown in FIG. 1; in position supported on a peripheral building steel support.
Figure 3:
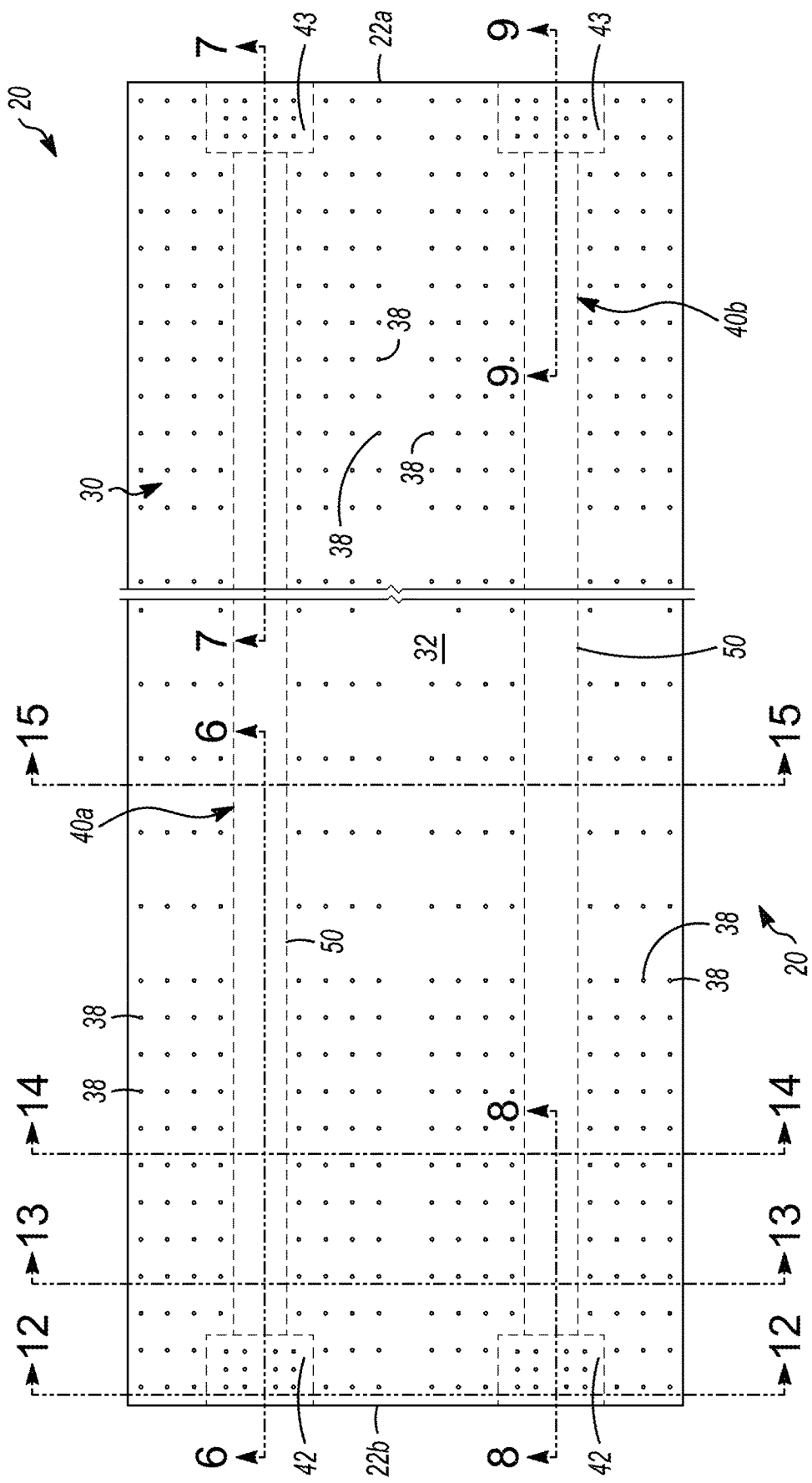
FIG. 3 illustrates schematically a top view of a flooring panel assembly shown in FIG. 2.

FIGS. 2 and 3 illustrate best the construction of each of flooring panel assembly 20 used in the formation of the building floor 10 shown in FIG. 1. Each panel assembly 20 typically has a generally rectangular configuration with a longitudinal length and thickness to provide structural integrity selected to span largely unsupported from the building core 12 to the steel perimeter support beam 16. Typically, the floor panel assembly 20 is provided with a longitudinal length of between about 7 to 20 metres and preferably 10 to 15 metres. The lateral width of the panel and assemblies are selected at between about 1 and 5 metres, and preferably 2 and 4 metres. Smaller or larger panel assemblies 20 may, however, be provided depending upon the particular floor 10 configuration and installation site requirements.

FIG. 2 shows a representative pictorial view of the flooring panel assembly 20, in position supported at each longitudinal end 20a, 20b, 20c by the building core 16 on the metal support I-beam 16. The structural flooring panel assembly 20 is shown as being overlain by a concrete top layer 36. The concrete top layer 36 preferably is formed having a thickness of between about 2 and 4 inches. The concrete top layer 36 may be provided as part of the flooring panel assembly 20 when it is formed off-site. More preferably the top layer 36 is provided as a finish layer following the positioning and securement of each of the individual flooring panel assemblies 20 to the building core 12 and support beam 16, as a final step to finish each building floor 10.

Figure 4:
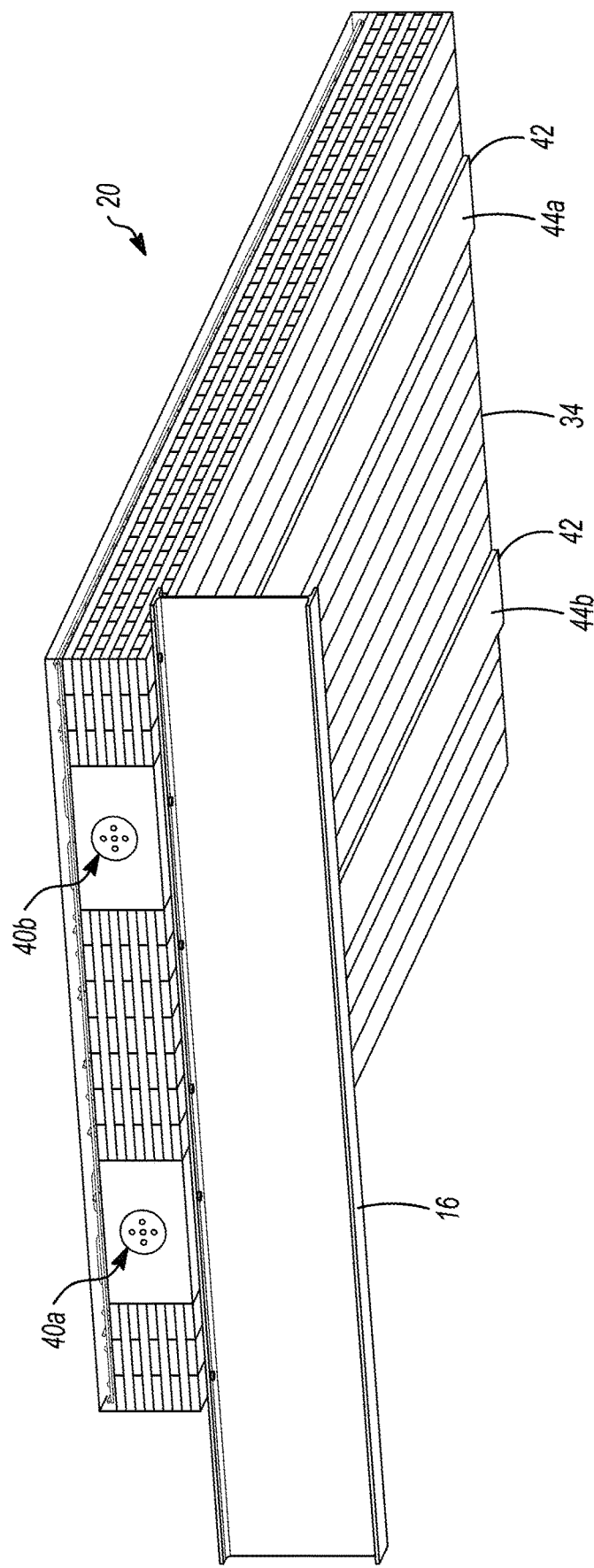
FIG. 4 shows schematically a perspective bottom view of the flooring panel assembly illustrated in FIG. 2.

FIGS. 2 and 4 show schematically top and bottom views of the structural flooring panel assembly 20. The flooring panel assembly 20 is provided with a cellulose-based cross-laminated timber (CLT) core 30 which has planar top and bottom surfaces 32, 34, and which is provided with structural reinforcement by a pair of longitudinally extending parallel spaced panel reinforcing assemblies 40a, 40b. As will be described, the panel reinforcing assemblies 40 are secured relative to the CLT core 30 by the use of a suitable settable grouting 42.

FIGS. 2 and 3 illustrate best the panel assembly 20 as including a series of top anchors 90 which project upwardly from the core top surface 32. Each of the top anchors 90 is preferably provided in the form of an elongated threaded bolt or fastener which threadedly engages the core 30 at an acute angle of between about 40° and 80° relative to the top surface 32. The top anchors 90 project upwardly above the top surface 32 to an enlarged end portion configure for encapsulation by and mechanical engagement with the concrete top layer 36 once cured. The top anchors 90 may be in the form of lag bolts which secured to the CLT core 30 by threaded engagement so as to project angularly from the top surface 32 at an acute angle. Lag bolts 90 are provided with an enlarged diameter bolt head which is selected to provide a mechanical interlock with the concrete top layer 36 once it has been cured.

FIGS. 4 and 13 to 15 illustrate best the grouting 42 used in the affixation of the reinforcing assemblies 40a, 40b as forming longitudinally extend concrete bands 44a, 44b. In a most preferred construction, the concrete bands 40a, 40b project downwardly below the plane of the portion of the bottom surface 34 of the CLT core 30 which is not directly supported by either the building core 12 or perimeter beam 16. Although not essential, preferably the concrete bands 44a, 44b are formed to project downwardly below to the bottom surface 34 by a distance of between about 2 and 10 cm, and provide therebetween race ways for the installation of required electrical and/or plumbing infrastructure.

Figure 5:
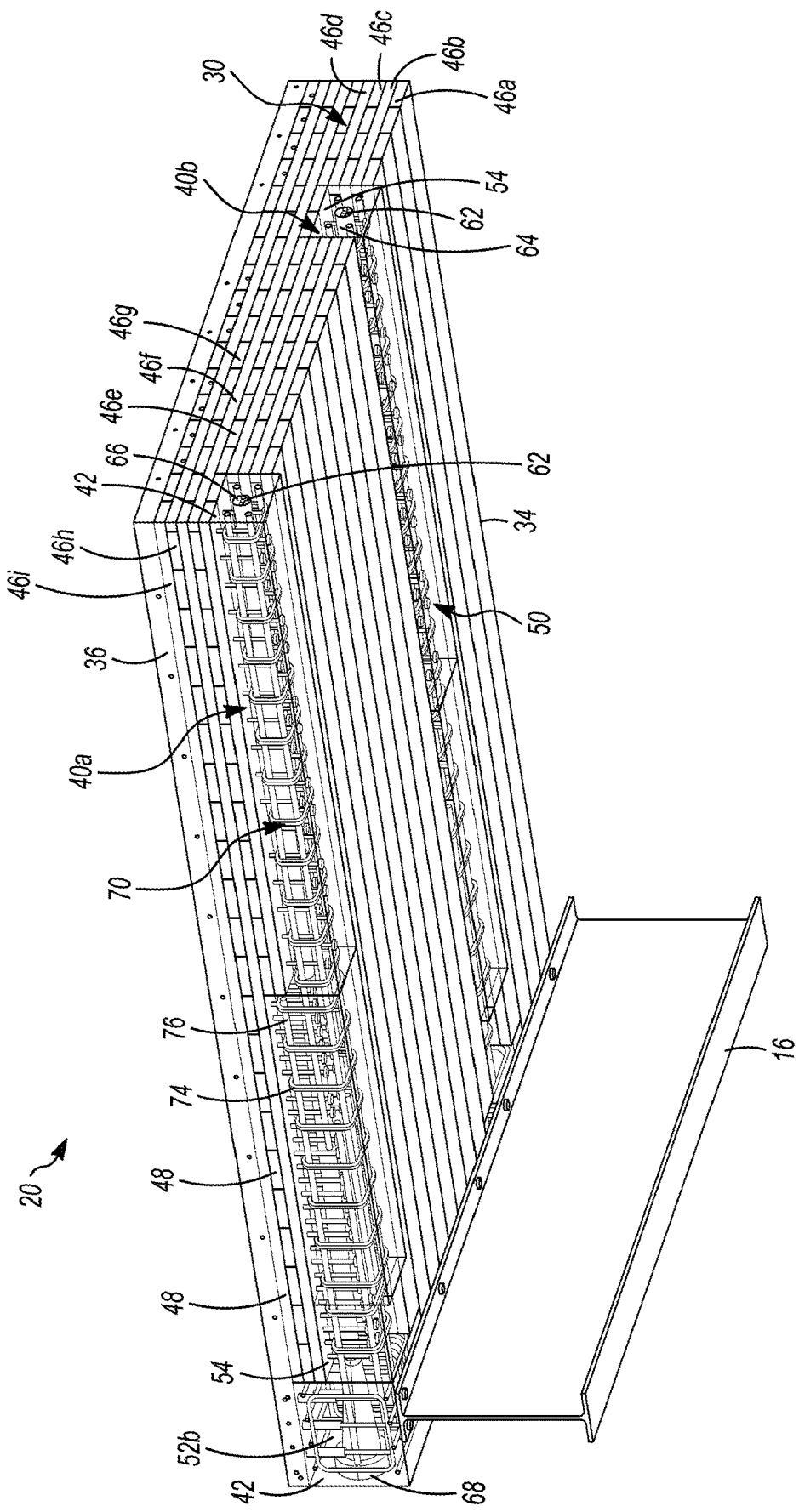
FIG. 5 shows schematically an enlarged, partial cut-away view of the flooring panel assembly shown in FIG. 4 illustrating the panel core and positioning of panel reinforcing and tensioning assemblies therein.

The configuration of the CLT core 30, grouting 42 and reinforcing assemblies 40a, 40b are illustrated best in the enlarged partial views of the flooring panel assembly 20 shown in FIGS. 5 to 9. In the embodiment illustrated, the CLT core 30 is made from nine laminated timber layers 46a-46i. Each timber layer 46 is formed by glue laminating in a side by side orientation, a number of elongated sawn hardwood timbers 48. The sawn timbers 48 have a vertical thickness of between about 2 and 6 cm, and a lateral width of about 10 and 30 cm. Different size sawn and/or engineered lumber sizes may, however, be used depending on the particular wood species selected. The sawn or timbers 48 of each individual layer 46a-i are successively arranged with their longitudinal length in alternating perpendicular orientation, with respect to the orientation of the members above and below. In particular, the ends of the timbers 48 in each timber layer 46 are staggered, and finger jointed in an end to end manner, with a next longitudinally adjacent timber end. FIG. 5 shows best the timbers 48 of each timber layer 46a-46i as being laminated with the timbers arranged in a parallel array, and with the longitudinal orientation of the timbers 48 of each successive timber layer 46 being oriented orthogonally relative to those of the next adjacent timber layer.

FIG. 5 illustrates best the positioning of the reinforcing assemblies 40a, 40b with a respective longitudinal channel 50 which extends upwardly into the bottom surface 34 of the CLT core 30. Each reinforcing assembly 40a, 40b is sized for placement so as to be received substantially within the interior of a respective channel 50 in a configuration fully encapsulated by the grouting 42. The cross-sectional views shown in FIGS. 6 to 9 illustrate best each channel 50 as being parallel to the longitudinal length of the CLT core 30. The channels 50 extend longitudinally from a pocket 52a, 52b formed through the CLT core 30 at each respective end 22a, 22b.

In a simplified construction, the channels 50 are parallel-sided, and extend upwardly into the bottom surface 34 to an innermost channel end 54. The innermost channel end 54 is preferably stepped downwardly from each end pocket 52a, 52b, to provide a channel depth which tapers vertically downwardly in height from each panel end 22a, 22b. Most preferably, with the exception of the pockets 52a, 52b, the channels 50 are formed such that the CLT core 30 maintains a minimum thickness of at least three orthogonally oriented timber layers 46g, 46h, 46i substantially along the flooring panel assembly 20 longitudinal length.

FIGS. 10 to 15 show best each reinforcing assembly 40a, 40b as including a tensioning assembly 60 and a reinforcing cage 70. The tensioning assembly 60 includes five metal wire tensioning cables 62 which are disposed within a plastic tubular sheath 64, and which extend longitudinally between the channel pockets 52a, 52b. Although not essential, the sheath 64 and tensioning cables 62 are preferably arranged in each channel 50 extending in a downwardly concave orientation between each panel end 22a, 22b. Preferably the tensioning cables are provided in the form of wire rope or cable, and are tensioned following setting of the grouting 42, and thereafter held under tension by way of end cable anchors 68. The tubular sheath 64 is provided to maintain substantial isolation between the tensioning cables 62 and the grouting 42. The sheath 64 is preferably made of plastic and has sufficient structural integrity to resist collapse and enable to permit post-tensioning of the tensioning cables 62 following the positioning of the tensioning assembly within the channel 50 and the setting of the grouting 42. The tubular sheath 64 further is provided with a diameter selected to permit the infilling of the sheath interior with a suitable bonding resin 66 following post-tensioning of the cables 62, to fix the tension cables 62 within the channel 50 with a pre-selected tension face, and in a fully bonded configuration.

Figure 12:
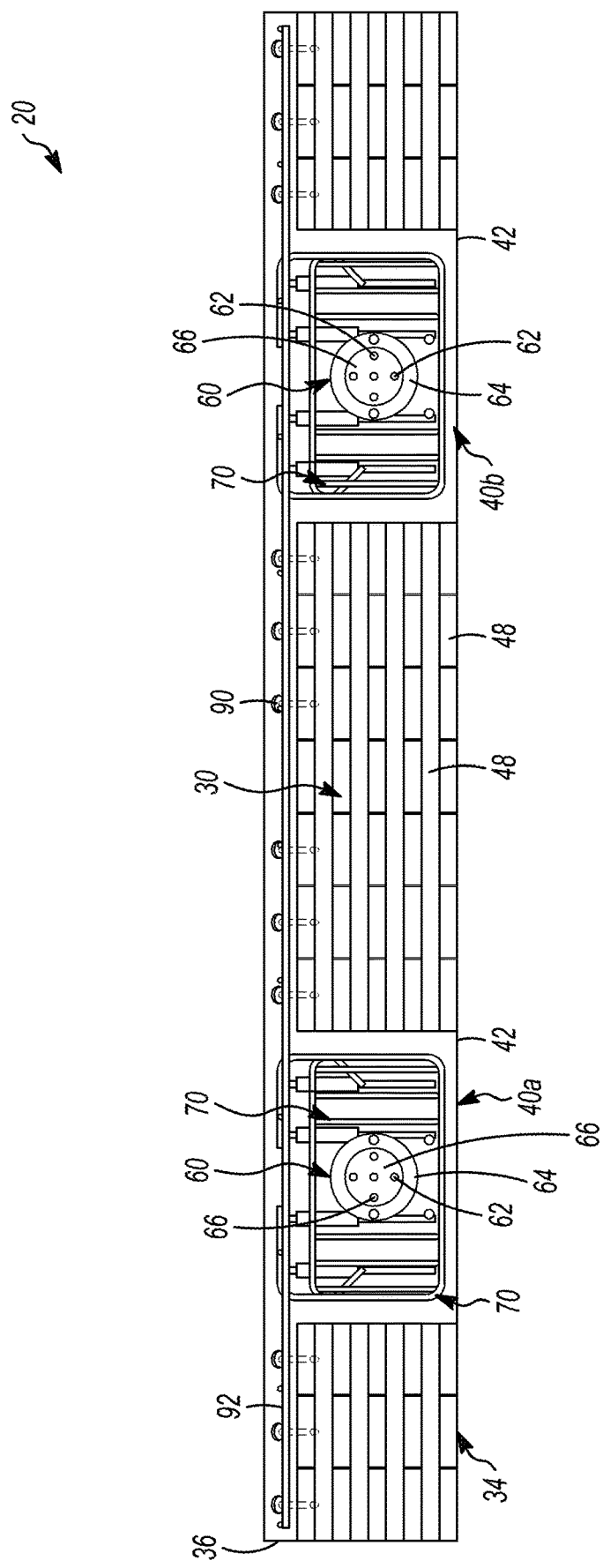
FIG. 12 shows a cross-sectional view of the flooring panel assembly shown in FIG. 3 taken along line 12-12.
Figure 13:
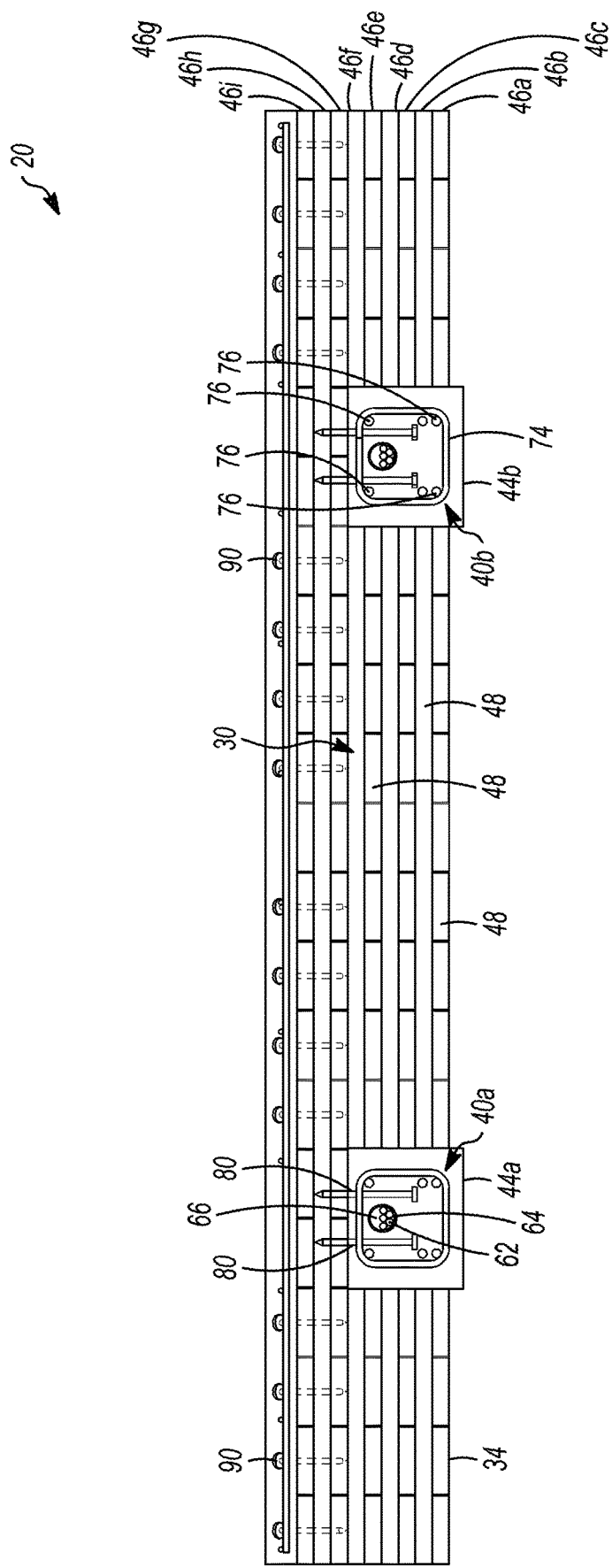
FIG. 13 shows a cross-sectional view of the flooring panel assembly shown in FIG. 3 taken along line 13-13.
Figure 14:
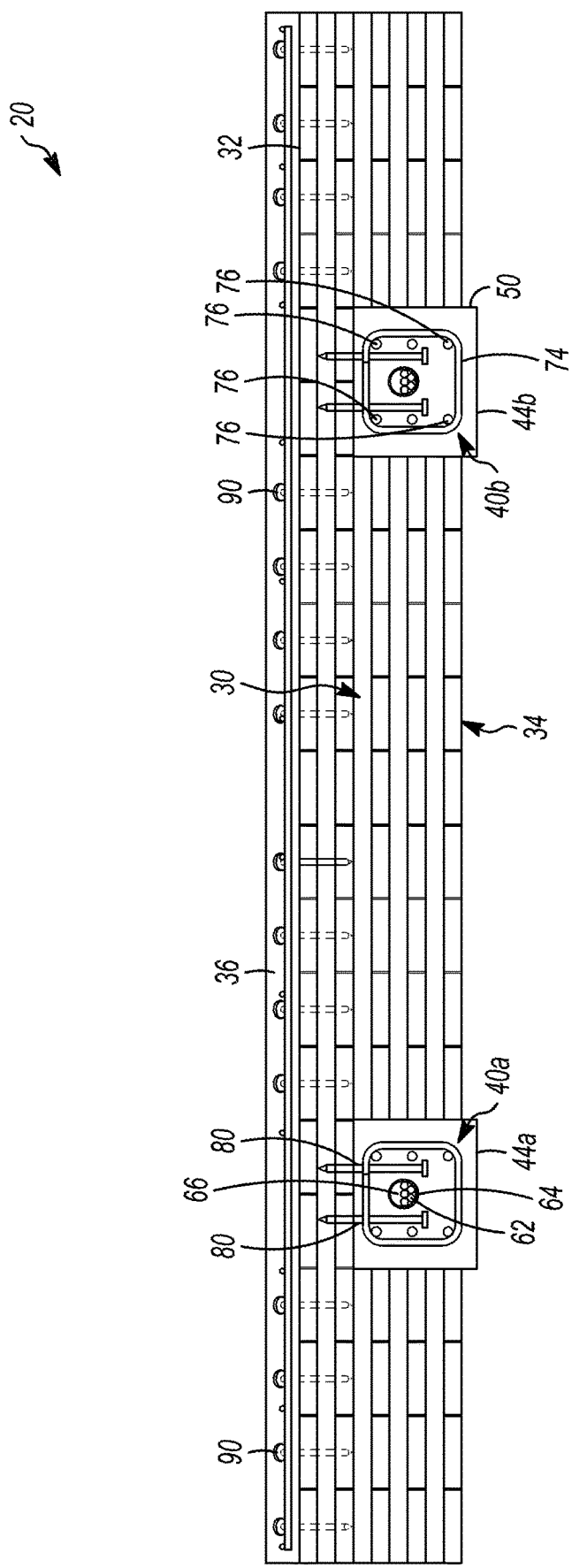
FIG. 14 shows a cross-sectional view of the flooring panel assembly shown in FIG. 3 taken along line 14-14.
Figure 15:
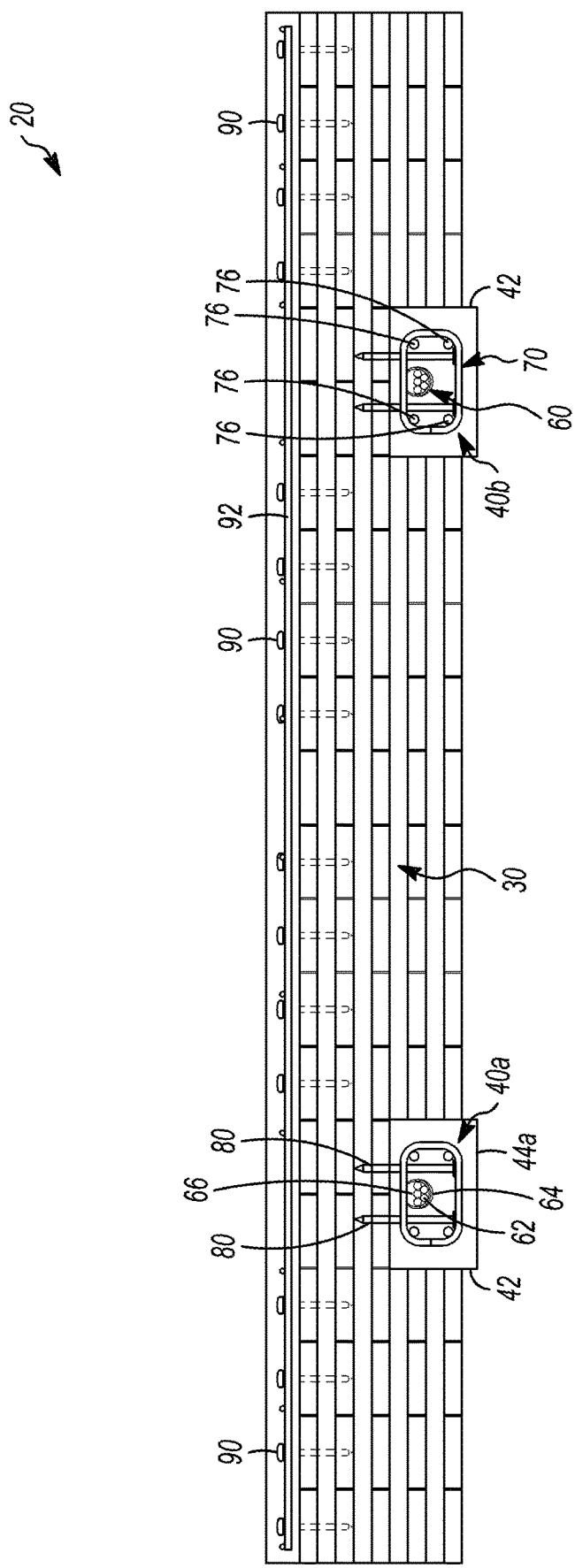
FIG. 15 illustrates schematically a cross-sectional view of the flooring panel assembly illustrated in FIG. 3 taken along line 15-15.
Figure 16:
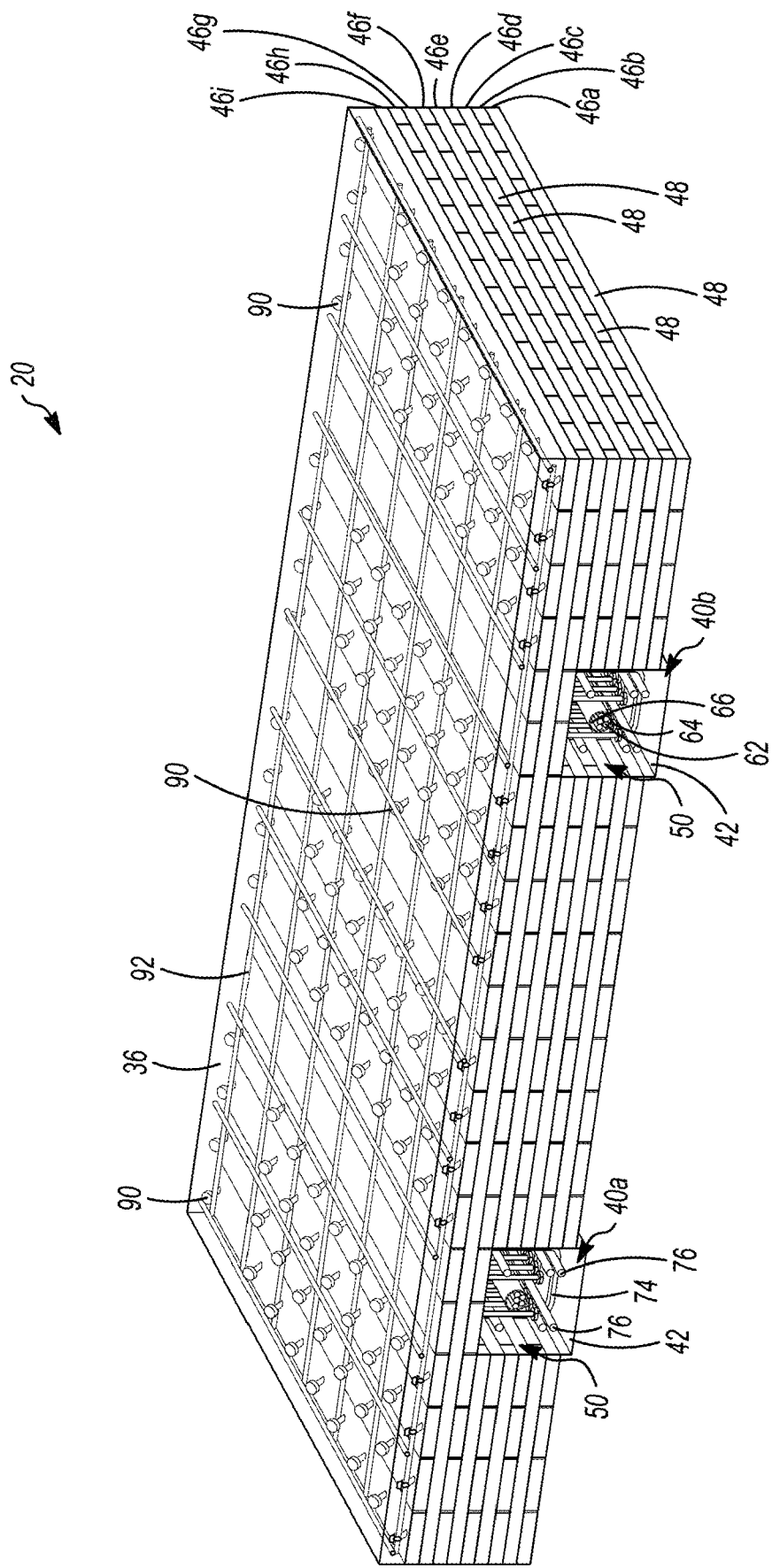
FIG. 16 illustrates a perspective view of the flooring panel assembly shown in FIG. 13, illustrating schematically the reinforcing cage and tensioning assembly.

FIGS. 5 and 12 illustrates best each of the longitudinal ends of each of the tensioning cables 62 as being mechanically secured by a respective cable anchor 68. In a non-limiting arrangement, the cable anchors 68 include an interior portion configured to provide fluid communication with the interior of the tubular sheath 64, to facilitate the flow of bonding resin 66 therein, following cable tensioning. The anchors 68 are further selected to allow both the tensioning of the cables 62 and their securement in a selected tensioned state.

Figure 6:
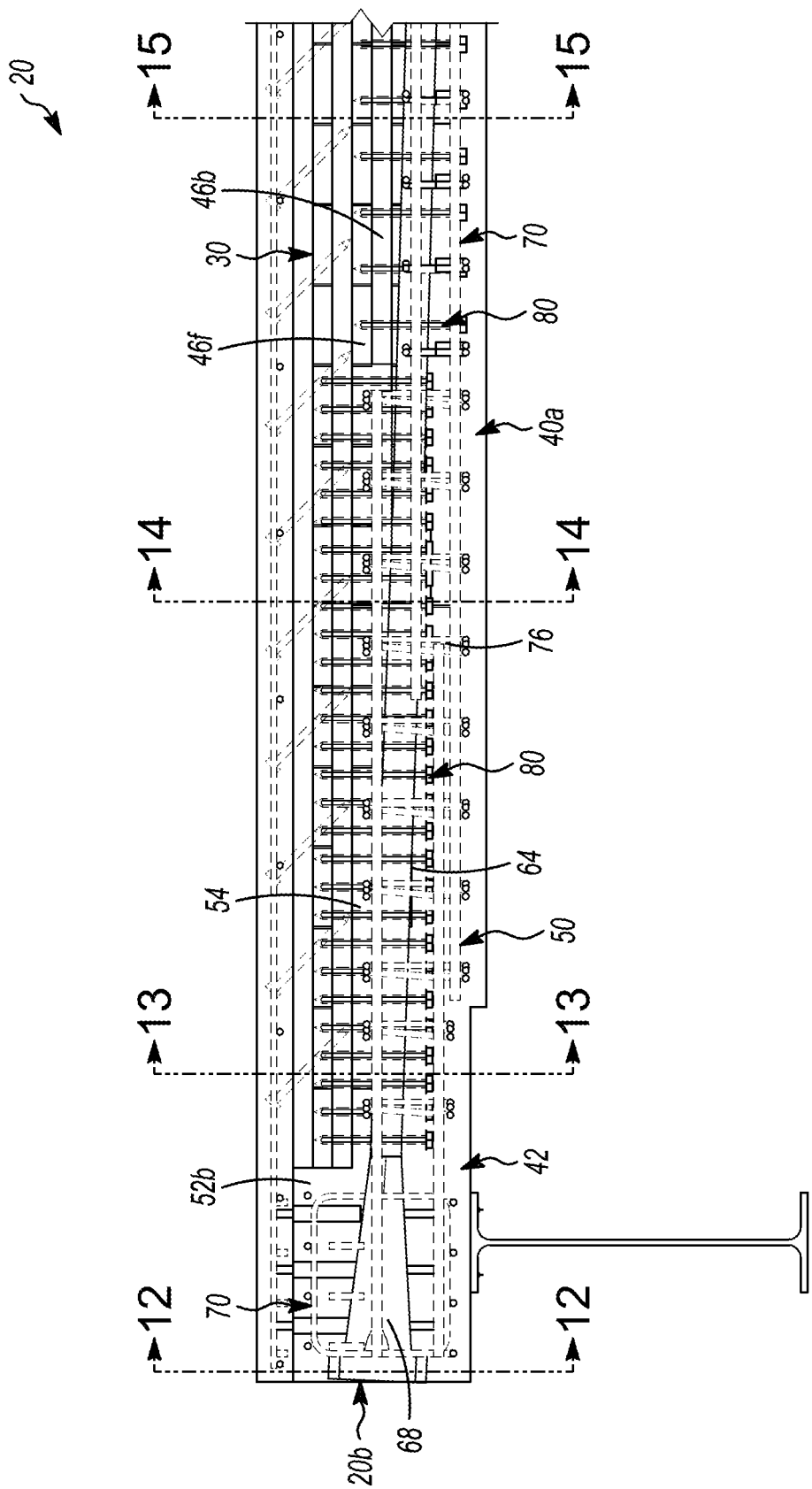
FIG. 6 illustrates schematically a partial cross-sectional view of the flooring panel assembly shown in FIG. 3 taken along line 6-6.
Figure 7:
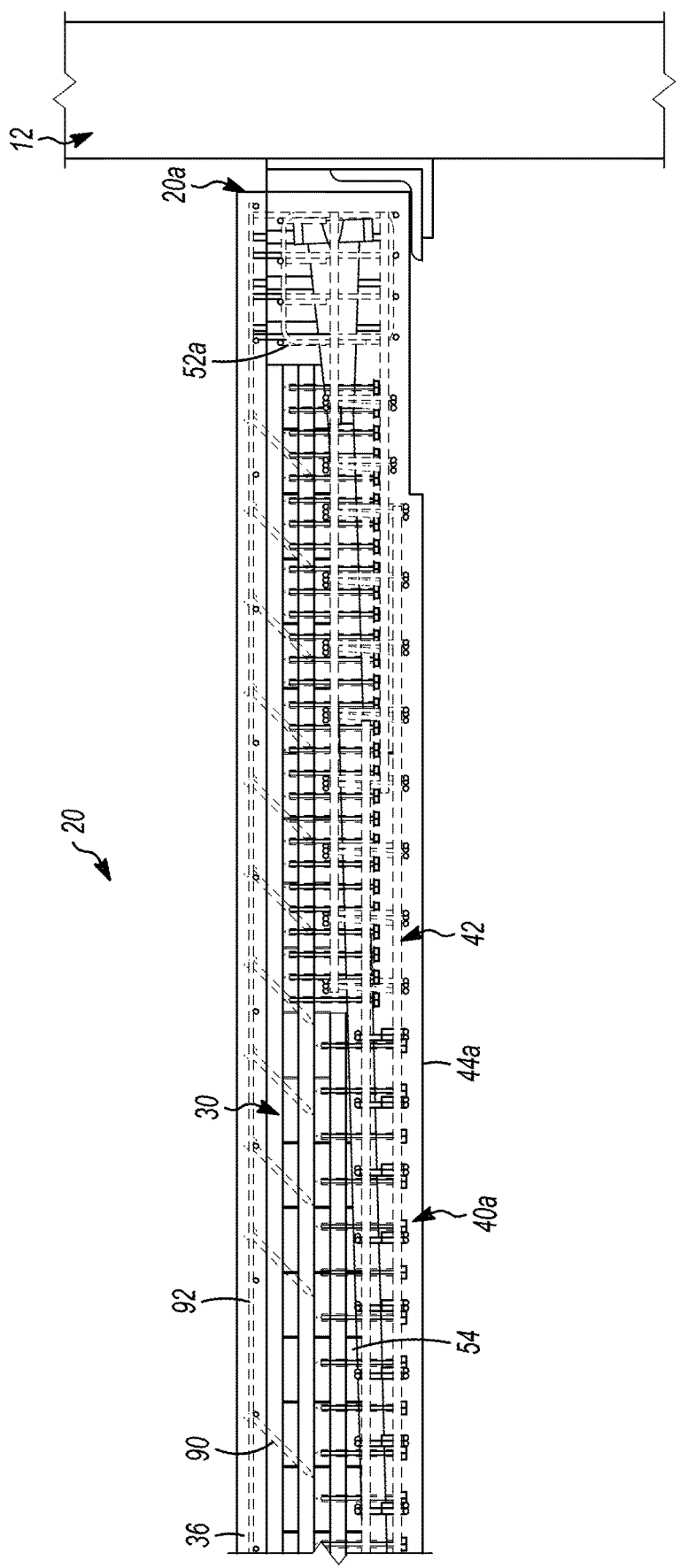
FIG. 7 illustrates schematically a cross-sectional view of the flooring panel assembly shown in FIG. 3 taken along line 7-7.
Figure 8:
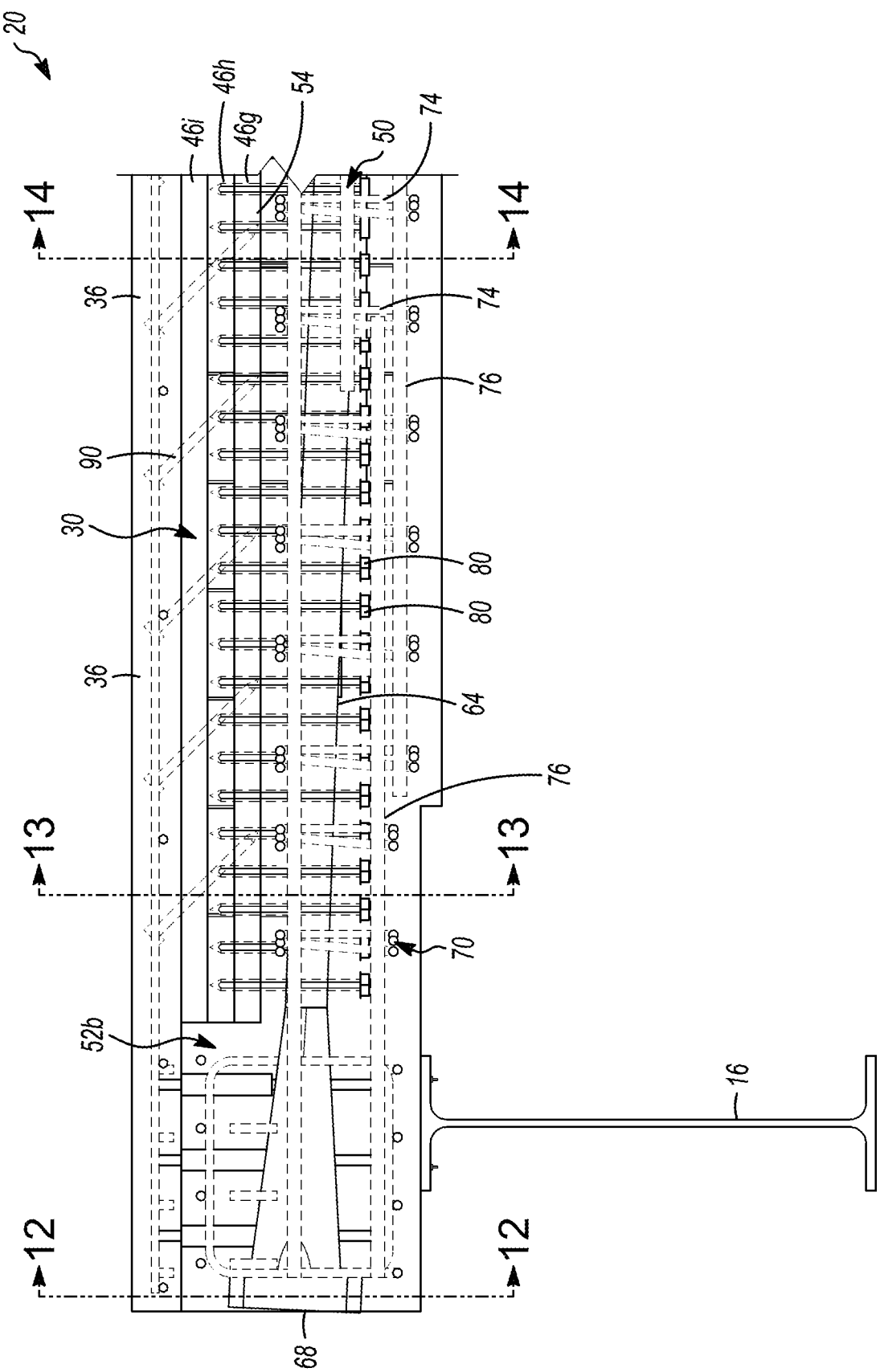
FIG. 8 illustrates an enlarged cross-sectional view of the flooring panel assembly shown in FIG. 3 taken along line 8-8.

FIGS. 6 to 7 illustrate best the tensioning cables 62 and sheath 64 as extending between the cable anchors along each associated channel 50 in a downwardly concave curving orientation from each panel assembly end portion 22a, 22b.

The tendons 62, sheath 64 and anchors 68 are confined within a reinforcing beam cage 70. The reinforcing cage 70 is formed with a stepped vertical profile which generally follows the stepped height of the channel 50. The reinforcing cage 70 includes a series of hoop ties 74. The beam cage 70 extends the longitudinal length of the flooring panel assembly 20 and provides additional reinforcement for the concrete grouting 42. The reinforcing cage 70 is illustrated best in FIGS. 5 and 12 longitudinally spaced reinforcing hoop ties or bands 74 extending substantially the length of the channel 50, and which are connected by longitudinally extending rebar members 76. As shown in FIG. 5, the tensioning assembly 64 extends through the reinforcing loops 74 of the cage 70 are further dimensioned so as to follow the step contour of the channel 50 and pockets 52a, 52b, facilitating substantial encapsulation of the reinforcing cage 70 by the grouting 42. As shown the cross-sectional views illustrated in FIGS. 6 to 9, the hoop ties 74 diminish in height together with the channel 50 tapering, from each respective longitudinal panel ends 22a, 22b, to a lowermost panel midsection.

FIGS. 6 to 9 further illustrate each reinforcing assembly 40 further as including a series of lag anchors 80. The lag anchors 80 are threadedly inserted into the CLT core 30 along substantially the longitudinal length of each channel 50 Each of the lag anchors 80 projects vertically from core 30 a distance downwardly into the channel 50 and includes an enlarged downwardly projecting anchor head and which is selected to assist in maintaining a mechanical coupling of the grouting 42 to the CLT core 30.

Figure 10:
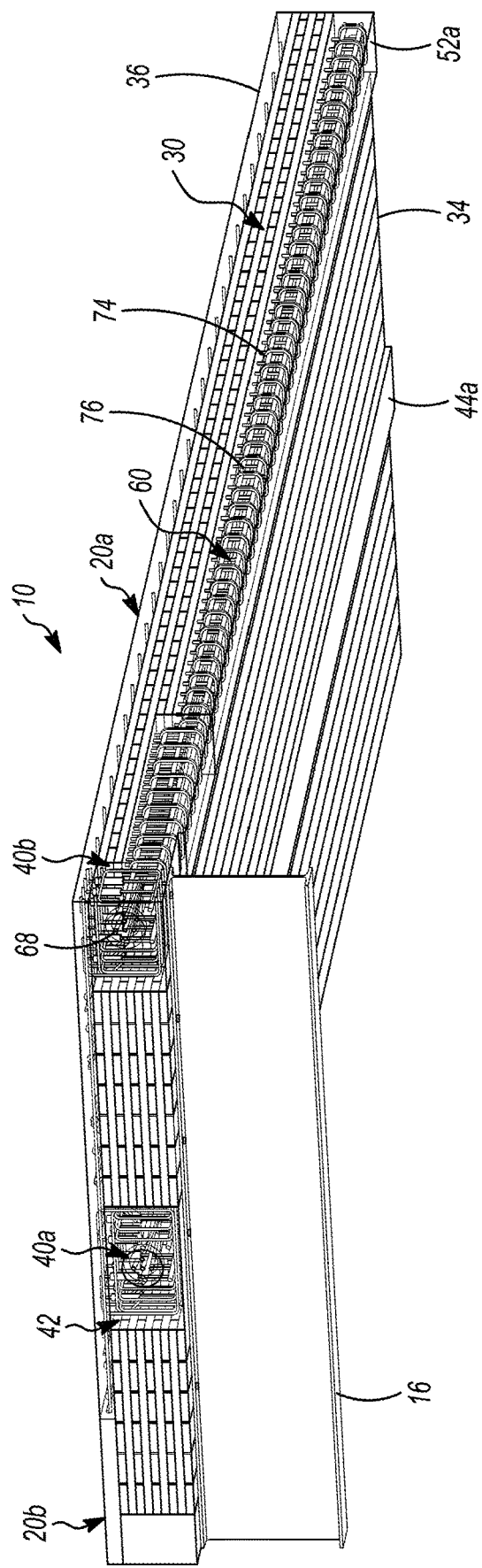
FIG. 10 shows schematically a partial cut-away perspective view of the building floor illustrated in FIG. 1 illustrating the relative positioning of the flooring panel assembly shown in FIG. 5 on a peripheral building support.
Figure 11:
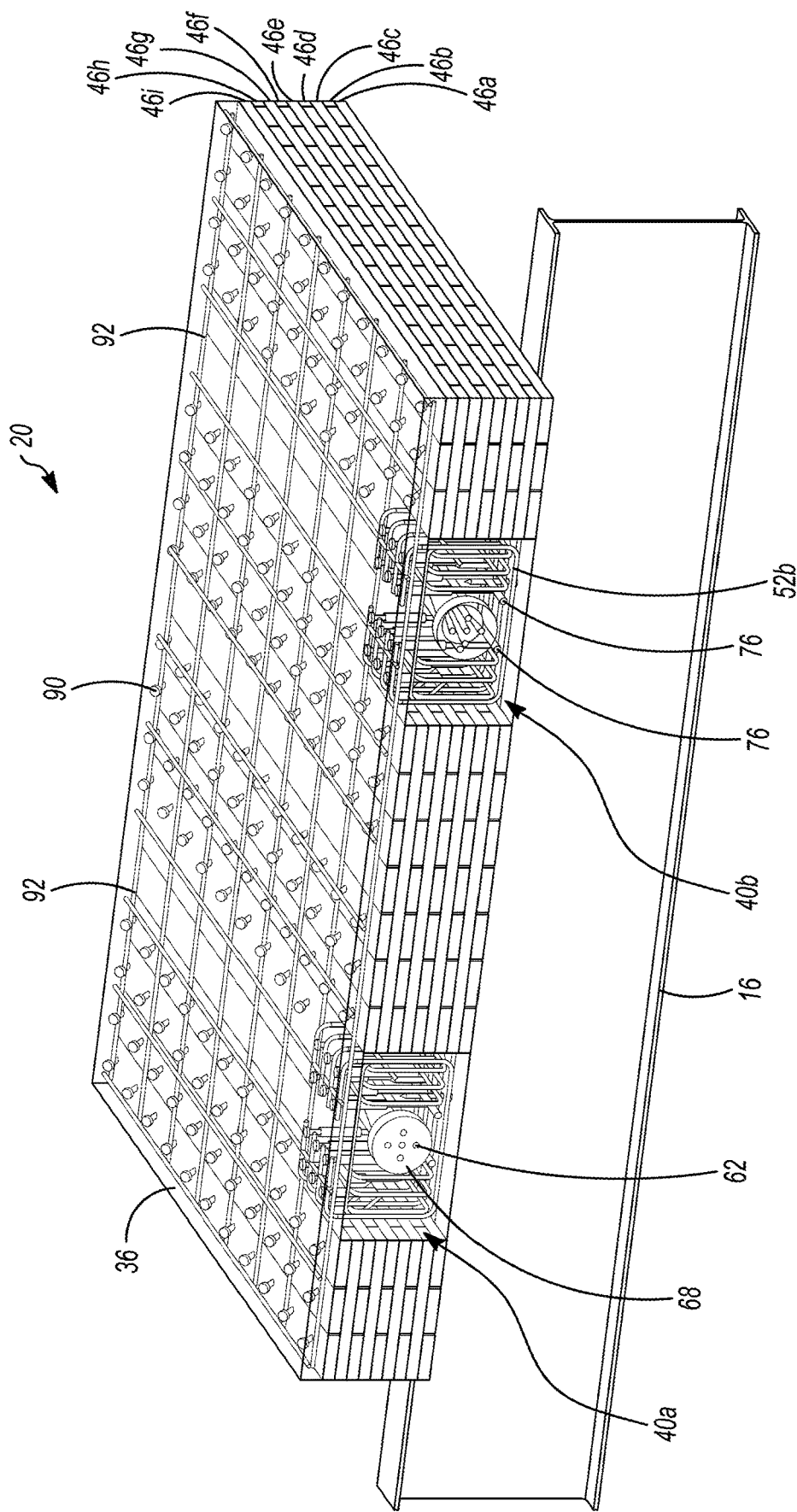
FIG. 11 illustrates an enlarged partial in view of the flooring panel assembly illustrated in FIG. 5 showing schematically, the positioning of tendon anchors within end anchor pockets in each longitudinal end of the panel assembly.

FIG. 10 illustrates a partial cut-away sectional view of a building floor 10, formed by the side-by-side placement of flooring panel assemblies 20a, 20b, as illustrated in FIG. 2. In one embodiment, the panel assemblies 20a, 20b may be mechanically and/or chemically joined along their abutting sides by suitable mechanical fasteners and/or adhesives and the like. More preferably, a metal mesh 92 may also be provided over the top surface 32 to assist in maintaining the structural integrity of the top layer 36 across adjacent panel assemblies 20a, 20b, 20c.

Figure 9:
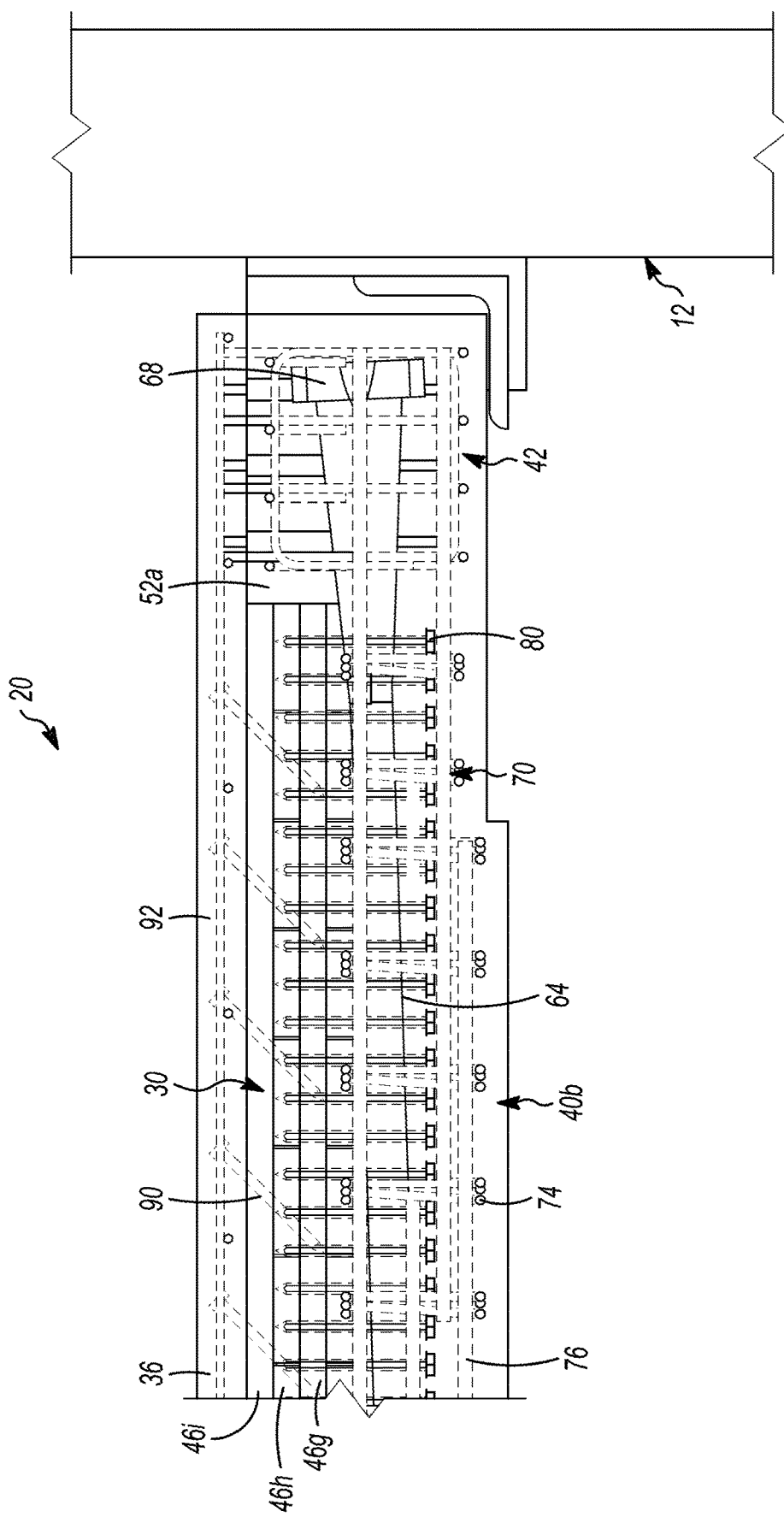
FIG. 9 illustrates an enlarged cross-sectional view of the flooring panel assembly shown in FIG. 3 taken along line 9-9.

FIGS. 9 and 10 illustrate the concrete band or reinforcing support assembly 40 as being positioned substantially within the CLT core 30. The support assembly 40 has a varying profile and elevation within the cellulous core 30. Preferably, each support assembly 40 is disposed with a respective arcuately downwardly curving channel which is formed longitudinally into the lower side of the CLT core 30. Each channel extends vertically through each beam layer at both associated opposed channel end portions. The vertical depth of channel diminishes towards the longitudinal center portion ($C_p$) of the core 30. The channel is preferably milled into the lower side of the core with a lateral width of between about 3 and 30 cm, preferably between about 10 to 20 cm, and a minimum vertical extent at the center portion $C_p$ selected to extend through at least the lowermost two and preferably three lowermost CLT layers.

Most preferably, the channels 60 are formed by the selective removal of all or part of individual sawn or engineered lumber 50. A series of mechanical fasteners, cleats, bolt heads or other suitable connectors 120 are driven into the CLT core 30 along the length of each channel 60. The mechanical engagement between the grouting 80 and the ends of the connectors 120 acts to further mechanically secure each support assembly 40 to the CLT core 30 along its longitudinal length.

Although not essential, most preferably, a series of lag bolts 90 or other mechanical anchors, may be pre-installed in the core 30, so as to project upwardly from a top surface 32 of the uppermost CLT layer 46i. As illustrated schematically in FIGS. 6 to 8, the lag bolts advantageously may function to facilitate the structural adherence of the top layer 36 in thickness of 5 cm to 12 cm.

In a preferred construction, the flooring panel assembly 20 is provided, such that following its placement and securement in position, the concrete top layer 36 may be then applied thereover to both provide a finished flooring surface, as well as infill any gaps between the panel assembly 20 and each of the building core 12 and peripheral support beam 16.

Preferably, each flooring panel assembly 20 is manufactured off-site as substantially pre-manufactured construct ready for placement in position spanning between the building core 12 and peripheral support beam 16. In manufacture, the CLT core 30 is formed by glue laminating the desired number of timber layers 46a-46(x) with the desired longitudinal length, width and thickness.

In the lamination of the timber layers 46a-x, channels 50 may be formed by the selective placement and/or omission of individual timbers 48 necessary to initially form the CLT core 30 with the desired stepped channel 50 arrangement. In an alternative manufacture, the CLT core 30 may be formed as a monolithic rectangular CLT blank in the first instance. Channels 50 may be formed by as suitable milling or routing the desired channel configurations into underside 34 of the assembled core 30.

Following the formation of channels 50, a reinforcing beam cage 70 is assembled and positioned within each associated channel interior, together with the lag anchors 80.

The tubular sheath 64 with the desired untensioned cables 62 therein is then inserted longitudinally along the beam cage interior 70, and suitable clamps or cable anchors 68 are then coupled to the untensioned cable ends. The cable anchors 68 are preferably selected to enable both the subsequent tensioning of the individual cables 62, securement, the cables 62 maintained under a desired selected tension, following the application of a pre-selected tensioning force thereto.

The channels 50 are thereafter filled with the grouting 42, so as to substantially encapsulate the tensioning assembly sheath 64 and beam cage 70, whilst leaving the end of tensioning cable 62 exposed.

Following the setting of the grouting, the lag bolts 90 and metal mesh 92 are preferably coupled to the top surface 32 of the CLT core 30, and the panel assembly 20 is ready for installation at a building site as a substantially preformed unit either prior to or following cable 62 tensioning. In one possible embodiment, at the time of initial panel manufacture, the cables 62 are placed under a desired tension, and the bonding resin 66 is injected into the interior of the sheath 64 to secure each of the cables 62 in a fully bonded configuration. In the alternative, the cables 62 may be placed under the desired degree of tension and encapsulated in bonding resin 66 only following the delivery placement of the flooring panel assembly 20 in position at the building site spanning between the building core 12 and peripheral support beam 16.

After positioning of the flooring panel assembly 22 in place spanning between the building core 12 and support beam 16, desired electrical and/or plumbing rough-ins may be arranged on and/or through each CLT core 30. Following initial placement, each adjacent flooring panel assembly 20a, 20b, 20c are coupled along their adjacent abutting edges by suitable mechanical fasteners. The concrete top layer 36 is then poured over the top surfaces 32 of adjacent panel assemblies 20a, 20b, 20c to the described thickness, effecting a bond between the building core 12, support beam 16, and each panel end 22a, 22b of the building floor 10.

Although FIG. 1 illustrates the floor 10 as being formed from the abutting placement of three equal sized flooring panel assemblies 20a, 20b and 20c, the invention is not so limited. It is to be appreciated that in the construction of the high-rise building 8, flooring panel assemblies 20 having different widths and/or lengths may be provided, depending upon the specific building architecture and for configuration.

Although the detailed description illustrates each flooring panel assembly 20 as including two longitudinally elongated reinforcing assemblies 40a, 40b, individual panel assemblies 20 may be provided with fewer or greater number of reinforcing assemblies 40a, 40b depending upon the longitudinal span and load bearing requirements which are to be achieved.

Although the detailed description describes the CLT core 30 as being formed from a series of nine timber layers 46a-46i, the invention is not so limited. It is to be appreciated that the CLT core 30 may be provided with fewer or greater number of timber layers 46, depending upon the span and load requirements of the panel assembly 20.

Whilst the detailed description describes each timber layer 46 as being formed from a series of parallel laminated hardwood timbers, the invention is not limited to the specific construction which is disclosed. It is to be appreciated that timbers of different materials, sizes and/or combinations of timbers of various sizes may equally be used. Such timber, includes 2×4 timbers, 2×6 timbers, timbers made of different cellulose constructions, including without restriction, natural timbers made from softwood species of wood, as well as LVL timbers, MPP timbers, and/or other engineered wood timbers, such by way of example, micro-laminated timber beams.

Although the detailed description describes the panel assembly as including a pair of stepped channels 50, by fewer or greater numbers of channels may be provided, depending upon the panel assembly load requirements and/or applications.

Similarly, although FIG. 5 shows the channel 50 as a stepped channel which tapirs in height, in other configurations the channels may be provided with a constant height. Alternatively, the channels 50 may be formed so as to extend to an inner end surface which curves concavely downwardly from each pocket 52a, 52b.

Although the detailed description describes the preferred embodiment as residing in a structural flooring panel assembly 20 for use in high-rise constructions, the invention is not limited to the specific application which is disclosed. In other aspects, the assembly of the present invention may be provided as a cellulose-based structural beam for use in place of conventional I-beams, or micro-laminated engineered wood beams, and/or which may include a single or multiple reinforcing assemblies 40. In other aspects, a panel assembly may be provided for other building applications, as for example for use as a commercial or residential structural wall and/or roofing panel assembly.

Although the detailed description describes and illustrates various embodiments, the invention is not limited to the specific preferred examples which are disclosed. Modifications and variations will now occur to persons skilled in the art.

We claim:

1. A structural beam or building panel assembly, the assembly comprising,
   a cellulose-based cross-laminated timber (CLT) core, the core having generally planar upper and lower surfaces and comprising a plurality of laminated timber layers, each timber layer comprising a plurality of elongated timber members arranged in a substantially parallel array, an elongated orientation of the timber members of each array being oriented orthogonally relative to that of a next adjacent array,
   at least one longitudinally extending channel extending inwardly into a top or bottom surface of said core,
   an associated reinforcing assembly at least partially disposed in each said channel, each reinforcing assembly including a tensioning assembly,
   grouting substantially encapsulating and securing said tensioning assembly positioned relative to said channel, and wherein each tensioning assembly includes,
   an elongated sheath,
   at least one tendon disposed within said sheath and extending longitudinally substantially along a length of the channel, wherein the sheath being selected to sufficiently isolate the at least one tendon from said grouting to permit post-tensioning of the at least one tendon following setting of said grouting, and at least one tendon anchor selectively engageable with an end portion of at least one said tendon to maintain said at least one tendon under tension in a selected tensioned state relative to said core.

2. The assembly as claimed in claim 1, wherein the tensioning assembly includes a binder disposed in said sleeve and selected to fix the at least one tendon therein in a fully grouted configuration.

3. The assembly as claimed in claim 1, wherein the tensioning assembly further includes a longitudinally extending reinforcement cage substantially disposed in said channel, said reinforcement cage extending about a length of said at least one tendon.

4. The assembly as claimed in claim 1, wherein the reinforcement cage is stepped or tapers in height from each core end, the at least one tendon extends longitudinally along an interior of the reinforcement cage and curves concavely downward from each tendon end.

5. The assembly as claimed in claim 1, wherein said beam or building panel assembly comprises a structural floor panel assembly having a longitudinal length between about 5 and 20 meters.

6. The assembly as claimed in claim 5, wherein the longitudinal length is between about 7.5 and 15 meters.

7. The assembly as claimed in claim 1, wherein the channel extends inwardly into the lower surface of the core to an innermost channel end, the innermost channel end extending concavely downward from each core end.

8. The assembly as claimed in claim 1, wherein across a lateral cross-section of said channel, said core has minimum thickness equal to at least a thickness of three said timber layers.

9. The assembly as claimed in claim 1, further including a plurality of grouting anchors disposed at longitudinally spaced locations along said channel, said grouting anchors comprising threaded mechanical fasteners, spikes, cleats, or a combination of two or more thereof.

10. The assembly as claimed in claim 1, wherein said assembly comprises a structural floor panel assembly, the floor panel assembly further comprising a plurality of top anchors mechanically coupled to the upper surface of the core, the top anchors projecting upwardly from the top surface and including an upper end portion configured to achieve a physical interlock with a curable panel cover layer.

11. A method of manufacturing the assembly as claimed in claim 1, comprising,
    laminating said timber layers to form said core with a longitudinal length between about 5 and 15 meters,
    forming said at least one channel in said upper or lower surface, each said channel substantially extending longitudinally from a first end of said core to a second other opposite end of said core,
    positioning the sheath and the at least one tendon of each tensioning assembly in the associated channel,
    at least partially encapsulating said sheath in said associated channel with said grouting, and
    following setting of said grouting, applying a selected tensioning force to said at least one tendon, and
    while said at least one tendon under said selected tensioning force, securing the tendon ends to maintain the tendon in a tensioned state.

12. The method as claimed in claim 11, wherein following application of the selected tensioning force, injecting said binder into said sleeve to substantially fix each of the tendons therein.

13. The method as claimed in claim 11, wherein prior to encapsulating said sheath with said grouting, securing said reinforcement cage to said core an orientation extending longitudinally along said channel, and wherein the step of encapsulating the sheath includes substantially encapsulating said reinforcement cage with said grouting.

14. The method as claimed in claim 11, comprising forming a plurality of said channels in said lower surface, the channels being parallel and spaced laterally from each other by a distance between about 30 cm and 200 cm.

15. The method as claimed in claim 14, wherein the distance is between about 50 cm and 150 cm.

16. The method as claimed in claim 11, wherein said assembly comprises a structural floor panel assembly, and said step of laminating said timber layers comprises forming said core with a lateral width between about 2 and 10 meters.

17. The method as claimed in claim 16, wherein the lateral width is between about 3 and 7.5 meters.

18. A structural building beam or flooring panel assembly having a longitudinal length and lateral width, the assembly comprising, a cross-laminated core having upper and lower surfaces and comprising at least five vertically stacked laminated beam layers, each said beam layer comprising a plurality of longitudinally elongated cellulose members arranged in a substantially parallel array, the longitudinal orientation of the cellulose members of the uppermost and lowermost beam layers being generally parallel, and wherein the array of cellulose members of each beam layer is arranged in a successively alternating normal orientation with the orientation of the array of cellulose members of the next adjacent beam layer, one or a plurality of longitudinally extending channels being formed in the lower surface, each channel extending vertically a minimum distance through at least one of said beam layers,
    a reinforcing assembly at least partially disposed in each said channel and comprising, a tensioning assembly comprising at least one elongated tendon extending longitudinally substantially the longitudinal length of the panel assembly, and grouting substantially encapsulating the tendon assembly and maintaining tendon assembly in position within said channel, and wherein the at least one elongated tendon comprises a post-tensioned tendon, wherein the post-tensioned tendon has been subjected to a selected tensioning force and fixed in place under tension following settling of the grouting.

19. The assembly as claimed in claim 18, further including a plurality of grouting anchors disposed in said channel, the grouting anchors being mechanically coupled to the core and configured for physical engagement with said grouting to assist in securing the reinforcing assembly in a position relative to said channel.

20. The assembly as claimed in claim 18, wherein the grouting anchors comprises a plurality of threaded fasteners, the threaded fasteners being longitudinally spaced along the channel and having enlarged end portions adapted for encapsulation by said grouting.

21. The assembly as claimed in claim 18, wherein each channel extends vertically the minimum distance through at least two of said beam layers.

* * * * *